United States Patent
Tomita et al.

(10) Patent No.: US 8,522,551 B2
(45) Date of Patent: Sep. 3, 2013

(54) APPARATUS FOR DETERMINING AN ABNORMALITY OF A CONTROL VALVE OF AN INTERNAL COMBUSTION ENGINE

(75) Inventors: Tetsuji Tomita, Susono (JP); Taku Ibuki, Gotenba (JP); Yoshihisa Hirosawa, Kariya (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 265 days.

(21) Appl. No.: 12/997,049

(22) PCT Filed: Jul. 16, 2009

(86) PCT No.: PCT/JP2009/063236
§ 371 (c)(1),
(2), (4) Date: Dec. 9, 2010

(87) PCT Pub. No.: WO2011/007456
PCT Pub. Date: Jan. 20, 2011

(65) Prior Publication Data
US 2011/0167816 A1 Jul. 14, 2011

(51) Int. Cl.
*F02B 37/013* (2006.01)
*F02B 33/44* (2006.01)
*F02B 33/00* (2006.01)

(52) U.S. Cl.
USPC ............................. 60/612; 60/611; 123/562

(58) Field of Classification Search
USPC ........................... 60/612, 611, 602; 123/562
See application file for complete search history.

(56) References Cited

U.S. PATENT DOCUMENTS

| | | | | |
|---|---|---|---|---|
| 5,144,803 A | * | 9/1992 | Yoshioka et al. | 60/612 |
| 5,154,057 A | * | 10/1992 | Yoshioka et al. | 60/612 |
| 5,277,029 A | * | 1/1994 | Kidokoro et al. | 60/612 |
| 5,289,684 A | * | 3/1994 | Yoshioka et al. | 60/612 |
| 7,066,157 B2 | * | 6/2006 | Takahashi et al. | 123/559.1 |
| 7,509,210 B2 | * | 3/2009 | Tsuda et al. | 701/114 |
| 7,667,227 B2 | * | 2/2010 | Shimamune et al. | 257/19 |

(Continued)

FOREIGN PATENT DOCUMENTS

| | | |
|---|---|---|
| EP | 1 678 415 A1 | 7/2006 |
| GB | 320986 D | 10/1929 |

(Continued)

OTHER PUBLICATIONS

Japanese Office Action dated Dec. 21, 2011, issued in corresponding Japanese Patent Application No. 2010-535926.

(Continued)

*Primary Examiner* — Thomas Denion
*Assistant Examiner* — Ngoc T Nguyen
(74) *Attorney, Agent, or Firm* — Sughrue Mion, PLLC

(57) ABSTRACT

An apparatus for determining an abnormality of a control valve is applied to an internal combustion engine having a first supercharger, a second supercharger, a first control valve, and a second control valve. The apparatus includes an electronic control unit to obtain two supercharging-pressure-corresponding-values before and after an opening degree of the first control valve is changed during a period in which the engine is operated in a specific operating state under which the first supercharger supercharges the engine more efficiently than the second supercharger, and to determine whether or not the second control valve is abnormal based on the two values with respect to the change of the opening degree of the first control valve.

9 Claims, 10 Drawing Sheets

(56) References Cited

U.S. PATENT DOCUMENTS

| | | | |
|---|---|---|---|
| 8,181,509 B2* | 5/2012 | Ibuki et al. | 73/114.79 |
| 8,201,406 B2* | 6/2012 | Kogo et al. | 60/612 |
| 2006/0248889 A1* | 11/2006 | Sagisaka et al. | 60/602 |
| 2007/0062188 A1* | 3/2007 | Fry et al. | 60/599 |
| 2008/0053088 A1* | 3/2008 | Yanakiev | 60/602 |
| 2009/0265080 A1* | 10/2009 | Fry et al. | 701/103 |

FOREIGN PATENT DOCUMENTS

| | | |
|---|---|---|
| JP | 02-063046 U | 3/1990 |
| JP | 02-078734 U | 3/1990 |
| JP | 03-106133 U | 5/1991 |
| JP | 04017723 A | 1/1992 |
| JP | 2002-276382 A | 9/2002 |
| JP | 2005-226501 A | 8/2005 |
| JP | 2007-505257 A | 3/2007 |
| JP | 2008297994 A | 12/2008 |

OTHER PUBLICATIONS

Translation of International Preliminary Report on Patentability for corresponding International Patent Application No. PCT/JP2009/063236 issued on Feb. 7, 2012.

Chinese Office Action dated Sep. 19, 2012, issued in Chinese Application No. 200980101101.5.

* cited by examiner (A)

| Mode | 1 | 2 | 3 | 4 |
|---|---|---|---|---|
| ECV (First control valve) | fully close | open | fully open | fully open |
| ACV (Second control valve) | fully close | fully close | open | fully open |
| EBV (Third Control valve) | fully close | fully close | fully close | open |

(B)

APPARATUS FOR DETERMINING AN ABNORMALITY OF A CONTROL VALVE OF AN INTERNAL COMBUSTION ENGINE

TECHNICAL FIELD

The present invention relates to an apparatus for determining an abnormality of a control valve, applied to an internal combustion engine having a plurality of superchargers (turbochargers) and a plurality of control valves for controlling the plurality of superchargers.

BACKGROUND ART

A conventionally known supercharger (exhaust gas turbine type supercharger) comprises a turbine which is disposed in an exhaust gas passage of an internal combustion engine and is driven by energy of an exhaust gas, and a compressor which is disposed in an intake air passage of the engine and is driven by the driven turbine. Accordingly, an air introduced into the compressor is compressed by the compressor, and thereafter the air is discharged toward combustion chambers. That is, a supercharging is performed.

It is well known that the supercharger can substantially compress an air introduced into the compressor, when a flow rate of the air is within a range from a predetermined surge flow rate to a predetermined choked flow rate. Generally, both of the surge flow rate and the choked flow rate increase as a capacity of the supercharger becomes greater. Accordingly, when only one supercharger having a relatively small capacity is used to perform the supercharging, the flow rate of the air introduced into the compressor reaches the choked flow rate under a high load operating condition of the engine, and therefore the supercharging can not be performed. On the other hand, when only one supercharger having a relatively large capacity is used to perform the supercharging, the flow rate of the air introduced into the compressor becomes smaller than the surge flow rate under a low load operating condition of the engine, and therefore the supercharging can not be performed. It is therefore understood that an operating area (load area) in which an internal combustion engine having a single supercharger can be appropriately supercharged is small compared to a whole operating area of the engine.

In view of the above, one of conventional internal combustion engines comprises: a first supercharger having a small capacity; a second supercharger having a large capacity and being connected in series with the first supercharger; a plurality of bypass passages for adjusting an air flow rate or an exhaust gas flow rate supplied to the first supercharger and the second supercharger, and a plurality of control valves disposed in the bypass passages. In this internal combustion engine, both the first supercharger and the second supercharger are appropriately used depending on the operating condition of the engine. This allows the operating area (load area) in which the engine is appropriately supercharged to be expanded.

In the conventional internal combustion engine described above, for example, a control valve (exhaust gas changeover valve) is disposed in a bypass passage for adjusting an exhaust gas flow rate supplied to the turbine of the first supercharger. This exhaust gas changeover valve is controlled by a control apparatus so as to be closed when the load of the engine is low and so as to be opened when the load of the engine is high. This allows the first supercharger having the small capacity to operate mainly when the engine is operated under the low load condition. In the meantime, this allows the second supercharger having the large capacity to operate mainly when the engine is operated under the high load condition. As a result, the engine is appropriately supercharged in a greater operating area, compared to an area where the engine having a single supercharger can be appropriately supercharged.

The control apparatus which the conventional internal combustion engine comprises determines whether or not the exhaust gas changeover valve operates properly/normally in order to retain a state where the engine is appropriately supercharged as described above. Specifically, the control apparatus stores/memorizes "a maximum value of the supercharging pressure when the exhaust gas changeover valve operates normally", the maximum value of the supercharging pressure being obtained by experiments performed in advance. Further, the control apparatus is configured in such a manner that it determines that the exhaust gas changeover valve is abnormal/anomalous when "an actual supercharging pressure" becomes larger than "the stored maximum value of the supercharging pressure" (see, for example, Japanese Examined Utility Model No. Hei 3-106133).

DISCLOSURE OF THE INVENTION

In the meantime, in order to retain such a condition where the engine is appropriately supercharged as described above, it is preferable for the control apparatus to determine not only whether or not the exhaust gas changeover valve operates properly, but also whether or not another control valve other than the exhaust gas changeover valve operates properly. More specifically, it is preferable for the control apparatus to further determine whether or not "a control valve (intake air changeover valve) disposed in a bypass passage for adjusting a flow rate of an air supplied to the compressor of the first supercharger" operates properly. However, the utility model does not disclose how to determine whether or not the intake air changeover valve operates normally at all.

The present invention is made to solve the problem described above. That is, one of objects of the present invention is to provide an apparatus for determining an abnormality of a control valve, applied to "an internal combustion engine having a plurality of superchargers, a plurality of bypass passages, and a plurality of control valves including the intake air changeover valve", which can determine whether or not the intake air changeover valve operates normally.

The apparatus for determining an abnormality of a control valve of an internal combustion engine which solves the problem described above is applied the internal combustion engine comprising: a first supercharger (turbocharger); a second supercharger (turbocharger); a first passage section; a first control valve corresponding to the exhaust gas changeover valve; a second passage section; and a second control valve corresponding to the intake air changeover valve.

The first supercharger comprises a first turbine and a first compressor.

The first turbine is disposed in an exhaust gas passage. Accordingly, the first turbine is driven by energy of an exhaust gas which is introduced into the first turbine. The first compressor is disposed in an intake air passage of the engine. The first compressor is configured so as to be driven by the driven first turbine. Consequently, the first compressor compresses an air introduced into the first compressor.

The second supercharger comprises a second turbine and a second compressor.

The second turbine is disposed in the exhaust gas passage at a downstream side of (at a position downstream of) the first turbine. Accordingly, the second turbine is driven by energy of an exhaust gas which is introduced into the second turbine.

The second compressor is disposed in the intake air passage at an upstream side of (at a position upstream of) the first compressor. The second compressor is configured so as to be driven by the driven second turbine. Consequently, the second compressor compresses an air introduced into the second compressor. That is, the first supercharger and the supercharger are connected in series with each other.

The first passage section is a passage, whose one end is connected to the exhaust gas passage at an upstream side of the first turbine and whose the other end is connected to the exhaust gas passage between the first turbine and the second turbine. That is, the first passage section constitutes a passage which bypasses the first turbine.

The first control valve is disposed in the first passage section. The first control valve is configured so as to change a passage area of the first passage section depending on an opening degree of the first control valve. Accordingly, the first control valve changes a ratio between "a magnitude of energy of the exhaust gas introduced into the first turbine" and "a magnitude of energy of the exhaust gas introduced into the second turbine".

The second passage section is a passage, whose one end is connected to the intake air passage between the first compressor and the second compressor, and whose the other end is connected to the intake air passage at a downstream side of the first compressor. That is, the second passage section constitutes a passage which bypasses the first compressor.

The second control valve is disposed in the second passage section. The second control valve is configured so as to change a passage area of the second passage section depending on an opening degree of the second control valve. Accordingly, the second control valve changes a ratio between "an amount of the air introduced into the first compressor" and "an amount of an air passing through the second passage section".

Further, the internal combustion engine is configured in such a manner that the first control valve and the second control valve are operated so that "at least the first compressor compresses the air introduced into the first compressor and discharges the compressed air (that is, the first compressor supercharges the engine)", when the engine is operated in "a predetermined operating area".

"The predetermined operating area" is an area which substantially coincides with an operating area in which "the first supercharger", among the first supercharger and the second supercharger, mainly supercharges the engine. The expression of "mainly supercharges" means that one of the first supercharger and the second supercharger supercharges the engine more efficiently than the other one of the superchargers. That is, "the first supercharger mainly supercharges the engine" means that "both the first supercharger and the second supercharger supercharge the engine, and the first supercharger supercharges the engine more efficiently than the second supercharger", or "only the first supercharger, among the first supercharger and the second supercharger, substantially supercharges the engine".

In addition, the apparatus for determining an abnormality of a control valve of the present invention, which is applied to the internal combustion engine described above, comprises supercharging-pressure-corresponding-value-obtaining-means and control valve abnormality determination means.

More specifically, the supercharging-pressure-corresponding-value-obtaining-means is configured so as to obtain "a supercharging-pressure-corresponding-value" which becomes larger as a pressure of an air in the intake air passage at the downstream side of the first compressor becomes larger.

It should be noted that "the pressure of the air in the intake air passage at the downstream side of the first compressor" may be a pressure of an air immediately after passing through the first compressor. Further, "the pressure of the air in the intake air passage at the downstream side of the first compressor" may be a pressure of an air in the intake air passage at a downstream side of "a pressure loss generation member disposed between the first compressor and combustion chambers, such as an intercooler and a throttle valve for a diesel engine". That is, "the pressure of the air in the intake air passage at the downstream side of the first compressor" is a pressure varying depending on a change in a supercharging condition of the first supercharger.

The supercharging-pressure-corresponding-value is not specifically limited, as long as it is a value which becomes larger as "the pressure of the air in the intake air passage at the downstream side of the first compressor" becomes larger. For example, "a supercharging pressure" which is the pressure of the air in the intake air passage at the downstream side of the first compressor may be adopted as the supercharging-pressure-corresponding-value. Further, for example, "an amount of a new air" which is an amount of an air introduced into the engine may be adopted as the supercharging-pressure-corresponding-value.

The control valve abnormality determination means is configured in such a manner that, (1) the control valve abnormality determination means obtains, as "a first value", the obtained supercharging-pressure-corresponding-value, during a period in which "an abnormality determining condition" including at least a condition that the engine is operated in the predetermined area is satisfied;

(2) the control valve abnormality determination means operates the first control valve, at a first timing after the timing at which the first value is obtained, in such a manner that the opening degree of the first control valve coincides with "a second opening degree" different from "a first opening degree which is an opening degree of the first control valve at a timing when the first value is obtained";

(3) the control valve abnormality determination means obtains, as "a second value", the obtained supercharging-pressure-corresponding-value at a second timing at which a predetermined time has elapsed from the first timing.

Furthermore, the control valve abnormality determination means is configured in such a manner that, (4) the control valve abnormality determination means determines that "the second control valve is abnormal", (a) if the second opening degree is larger than the first opening degree and the second value is larger than the first value, or (b) if the second opening degree is smaller than the first opening degree and the second value is smaller than the first value.

As described above, in the apparatus for determining an abnormality of a control valve according to the present invention, the first control valve is operated during the period in which "the abnormality determining condition" is satisfied in such a manner that the opening degree of the first control valve changes from "the first opening degree" to "the second opening degree". Thereafter, the supercharging-pressure-corresponding-value when the opening degree of the first control valve is the first opening degree (i.e., the first value) is compared with the supercharging-pressure-corresponding-value when the opening degree of the first control valve is the second opening degree (i.e., the second value). Further, "whether or not the second control valve is abnormal" is determined base on a result of the comparison.

In the present invention, the first opening degree may be larger or smaller than the second opening degree. Accordingly, a principle which the control valve abnormality determination means adopts in order to determine "whether or not the second control valve is abnormal" will be described hereinafter, for a case where "the second opening degree is larger than the first opening degree" and for a case where "the second opening degree is smaller than the first opening degree", separately.

1. In a case where the second opening degree is larger than the first opening degree (i.e., a case where the opening degree of the first control valve is increased).

As described above, the first control valve is disposed in the first passage section, whose one end is connected to the exhaust gas passage at the upstream side of the first turbine and whose the other end is connected to the exhaust gas passage between the first turbine and the second turbine. Therefore, a flow rate of the exhaust gas passing through the first passage section increases as the opening degree of the first control valve increases. Consequently, the magnitude of the energy supplied to the first turbine decreases and the magnitude of the energy supplied to the second turbine increases, as the opening degree of the first control valve increases.

In the meantime, as described above, as long as the second control valve is "normal", the second control valve is operated in such a manner that "at least the first compressor compresses the air introduced into the first compressor and discharges the compressed air" when the engine is operated in "the predetermined operating area".

Accordingly, when the opening degree of the first control valve is changed from the first opening degree to the second opening degree, the amount of the exhaust gas passing through the first passage section increases (i.e., the energy supplied to the first turbine decreases), and therefore a pressure ratio of the first compressor (=a pressure of an air at the downstream side of the first compressor/a pressure of an air at the upstream side of the first compressor) "decreases", if the second control valve is "normal".

Further, when the opening degree of the first control valve is changed from the first opening degree to the second opening degree as described above, the energy supplied to the second turbine increases by an amount of the energy corresponding to an increased amount of the flow rate of the exhaust gas passing through the first passage section, and therefore a pressure ratio of the second compressor (=a pressure of an air at the downstream side of the second compressor/a pressure of an air at the upstream side of the second compressor) "increases", if the second control valve is "normal".

In the meantime, "the abnormality determining condition" includes the condition which is satisfied "when the engine is operated in the predetermined area". Accordingly, when the engine is operated in the predetermined area, "the first supercharger" among the first supercharger and the second supercharger "mainly" supercharges the engine. Therefore, the pressure ratio of the first compressor is larger than the pressure ratio of the second compressor, when the opening degree of the first control valve is at the first opening degree. Further, when the opening degree of the first control valve is changed, a change amount in the pressure ratio of the first compressor is larger than a change amount in the pressure ratio of the second compressor. Consequently, when the opening degree of the first control valve is changed (increased in this case) from the first opening degree to the second opening degree, "a decreasing amount in the pressure ratio of the first compressor" is larger than "an increasing amount in the pressure ratio of the second compressor".

The supercharging pressure is obtained by multiplying "a pressure (generally, an atmospheric pressure) of an air flowing into the engine from its outside" by "a product of the pressure ratio of the first compressor and the pressure ratio of the second compressor (herein after, the product will be referred to as "total pressure ratio")". As described above, "the decreasing amount in the pressure ratio of the first compressor" is larger than "the increasing amount in the pressure ratio of the second compressor", when the opening degree of the first control valve is changed from the first opening degree to the second opening degree. Accordingly, the total pressure ratio decreases when the opening degree of the first control valve is changed from the first opening degree to the second opening degree, and therefore the supercharging pressure decreases.

To the contrary, if the second control valve is "abnormal", the first compressor can not compress the air introduced into the first compressor to discharge the compressed air, even when the engine is operated in the predetermined operating area. In other words, when the second control valve is "abnormal", such as when the second control valve is fully opened, the pressure at the upstream side of the first compressor is substantially equal to the pressure at the downstream side of the first compressor.

Accordingly, if the second control valve is "abnormal", the pressure ratio of the first compressor is substantially "1" when the opening degree of the first control valve is set at the first opening degree. In addition, if the second control valve is "abnormal", the pressure ratio of the first compressor is also substantially "1" when the opening degree of the first control valve is set at the second opening degree. That is, if the second control valve is "abnormal", the pressure ratio of the first compressor remains unchanged even when the opening degree of the first control valve is changed from the first opening degree to the second opening degree.

To the contrary, the second compressor can compress the air introduced into the second compressor and discharge the compressed air, even when the second control valve is abnormal. Accordingly, when the opening degree of the first control valve is changed (increased in this case) from the first opening degree to the second opening degree, the pressure ratio of the second compressor increases.

Therefore, if the second control valve is "abnormal", the total pressure ratio increases by an amount corresponding to the increase amount in the pressure ratio of the second compressor, when the opening degree of the first control valve is changed from the first opening degree to the second opening degree. As a result, the supercharging pressure "increases".

As described above, when the opening degree of the first control valve is changed from the first opening degree to the second opening degree larger than the first opening degree, the supercharging pressure "decreases" if the second control valve is "normal", and the supercharging pressure "increases" if the second control valve is "abnormal". In view of the above, the control valve abnormality determination means determines that "the second control valve is abnormal" when the condition described above (refer to (4) (a) above) is satisfied.

2. In a case where the second opening degree is smaller than the first opening degree (i.e., a case where the opening degree of the first control valve is decreased).

The flow rate of the exhaust gas passing through the first passage section decreases and the flow rate of the exhaust gas introduced into the first turbine increases, as the opening degree of the first control valve decreases. Therefore, the magnitude of the energy supplied to the first turbine therefore increases and the magnitude of the energy supplied to the second turbine decreases, as the opening degree of the first control valve decreases.

Accordingly, when the opening degree of the first control valve is changed from the first opening degree to the second opening degree, the energy supplied to the first turbine increases, and therefore the pressure ratio of the first compressor increases if the second control valve is "normal". At the same time, the pressure ratio of the second compressor "decreases".

As described above, when the abnormality determining condition is satisfied, the pressure ratio of the first compressor is larger than the pressure ratio of the second compressor. Further, when the opening degree of the first control valve is changed from the first opening degree to the second opening degree, an increasing amount in the pressure ratio of the first compressor is larger than a decreasing amount in the pressure ratio of the second compressor. Accordingly, at this time, the total pressure ratio increases. As a result, the supercharging pressure "increases".

To the contrary, if the second control valve is "abnormal", the pressure ratio of the first compressor remains unchanged even when the opening degree of the first control valve is changed, as described above. In the meantime, the second compressor can compress the air introduced into the second compressor and discharge the compressed air, even if the second control valve is "abnormal". Accordingly, when the opening degree of the first control valve is changed (decreased in this case) from the first opening degree to the second opening degree, the pressure ratio of the second compressor decreases.

Accordingly, if the second control valve is abnormal, the total pressure ratio decreases by an amount corresponding to the decrease amount in the pressure ratio of the second compressor, when the opening degree of the first control valve is changed from the first opening degree to the second opening degree. As a result, the supercharging pressure "decreases".

As described above, when the opening degree of the first control valve is changed from the first opening degree to the second opening degree smaller than the first opening degree, the supercharging pressure "increases" if the second control valve is "normal", and the supercharging pressure "decreases" if the second control valve is "abnormal". In view of the above, the control valve abnormality determination means determines that "the second control valve is abnormal" when the condition described above (refer to (4)(b) above) is satisfied. These are the principle to determine the abnormality of the second control valve adopted by the control valve abnormality determination means.

In the principle described above, "the supercharging pressure" is used as an indicative parameter to determine whether or not the second control valve is abnormal. However, the indicative parameter is not limited to the supercharging pressure. That is, it is possible to determine whether or not the second control valve is abnormal based on "an amount which increases as the supercharging pressure increases (i.e., the supercharging-pressure-corresponding-value)" as the indicative parameter in place of "the supercharging pressure", according to the principle described above.

In this manner, in the internal combustion engine having the plurality of the superchargers, the plurality of the bypass passages, and the plurality of the control valves including the intake air changeover valve, the apparatus for determining an abnormality of a control valve of the present invention operates the first control valve forcibly, and can determine whether or not the second control valve which is the intake air changeover valve is abnormal based on the result caused by the forcible operation of the first control valve.

Further, the control apparatus of the present invention can determine whether or not the second control valve is abnormal without disposing, in the second control valve, an opening degree sensor which directly detects the opening degree of the second control valve. As a result, a cost for manufacturing the engine can be reduced.

It should be noted that, in the control apparatus of the present invention, it is not necessary to always monitor both of whether or not "the second opening degree is larger than the first opening degree and the second value is larger than the first value" and whether or not "the second opening degree is smaller than the first opening degree and the second value is smaller than the first value". That is, the apparatus may monitor either one of those two only.

As described above, the supercharging-pressure-corresponding-value-obtaining-means of the apparatus for determining an abnormality of a control valve of the present invention according to the present invention is configured in such a manner that it obtains, as the supercharging-pressure-corresponding-value, "the amount which increases as the supercharging pressure increases".

The supercharging-pressure-corresponding-value-obtaining-means can be configured in such a manner that it obtains, as the supercharging-pressure-corresponding-value, "a supercharging pressure" which is a pressure of an air in the intake air passage at the downstream side of the first compressor. Further, the supercharging-pressure-corresponding-value-obtaining-means can be configured in such a manner that it obtains, as the supercharging-pressure-corresponding-value, "an amount of a new air" which is an amount of an air introduced into the engine.

In the apparatus for determining an abnormality of a control valve, it is preferable that the control valve abnormality determination means be configured in such a manner that it determines that "the first control valve is abnormal" when "an absolute value of a difference between the second value and the first value" is smaller than a first control valve abnormality determination threshold value.

As described above, the control valve abnormality determination means changes the opening degree of "the first control valve" from the first opening degree to the second opening degree, in order to determine whether or not "the second control valve" is abnormal. In the meantime, when a movable portion of "the first control valve" whose opening degree is to be changed fixed due to, for example, an adhesion of a solid composition (e.g. a soot, and the like) to the movable portion, the first control valve can not operate. Further, for example, when members constituting the first control vale are broken, the first control valve can not operate.

If the first control valve can not operate normally, the opening degree of the first control valve can not change sufficiently when the opening degree is tried to be changed from the first opening degree to the second opening degree. Consequently, when the first control valve is abnormal, such as when the first control valve can not operate at all, the energy supplied to each of the first turbine and the second turbine remains unchanged. At this time, the supercharging-pressure-corresponding-value also remains unchanged.

In view of the above, the control valve abnormality determination means determines that "the first control valve is abnormal" when "the absolute value of the difference between the second value and the first value" is smaller than the first control valve abnormality determination threshold value.

It should be noted that "the first control valve abnormality determination threshold value" is preferably set at an appropriate certain value which allows the control valve abnormality determination means to determine that the first control valve is abnormal, when the absolute value of the difference between the second value and the first value is smaller than the first control valve abnormality determination threshold value.

Further, the control valve abnormality determination means may be configured in such a manner that it "infers" that "the second control valve is normal" when it determines that "the first control valve is abnormal".

As described above, in the apparatus for determining an abnormality of a control valve of the present invention, the first control valve and the second control valve are operated in such a manner that "at least the first compressor compresses the air introduced into the first compressor and discharges the compressed air" when the abnormality determining condition is satisfied.

The second control valve is disposed in the second passage section, whose one end is connected to the intake air passage between the first compressor and the second compressor, and whose the other end is connected to the intake air passage at the downstream side of the first compressor. Accordingly, the amount of air passing through the second passage section becomes smaller, and the amount of air introduced into the first compressor becomes larger, as the opening degree of the second control vale becomes smaller. Therefore, the first compressor can "compresses the air introduced into the first compressor and discharges the compressed air" with more certainty, as the opening degree of the second control vale becomes smaller. It is thus preferable that the second control valve be operated so as to shut (i.e., completely close) the second passage section when the engine is operated in the predetermined operating area.

Furthermore, it is preferable that the second control valve be configured in such a manner that it can adjust the amount of the air introduced into the first compressor by varying the flow passage area of the second passage section depending on the opening degree of the second control valve.

Accordingly, as one of embodiments of the second control valve, a control valve which comprises "a valving element", "a valve seat portion" against which the valving element rests, and "biasing means" for biasing the valving element toward the valve seat portion, may be adopted. Specifically, the control valve may be configured in such a manner that the valving element is moved to "a first position at which the valving element rests against the valve seat portion" by an biasing force generated by the biasing means so as to close the second passage section, when "a pressure of an air in the second passage section at an upstream side of the second control valve is not larger than a pressure of an air in the second passage section at an downstream side of the second control valve by a predetermined pressure or more". Further, the control valve may be configured in such a manner that the valving element is moved to "a second position different from the first position" against the biasing force generated by the biasing means so as to "increase the flow passage area of the second passage section", when "the pressure of the air in the second passage section at the upstream side of the second control valve is larger than the pressure of the air in the second passage section at the downstream side of the second control valve by the predetermined pressure or more".

As another one of embodiments of the second control valve, a control valve (so called, a butterfly valve) which comprises a valving element which is rotatably movable around a predetermined axis may be adopted. Specifically, the control valve may be configured so as to close the second passage section when the valving member is at a first rotating position. The control valve may be configured so as to increase the flow passage area of the second passage when the valving member rotates toward a second rotating position different from the first rotating position.

As described above, in order to determine whether or not the second control valve is abnormal, the control valve abnormality determination means is configured so as to change the opening degree of the first control valve from a certain opening degree (the first opening degree) at a predetermined timing (the first timing) to another opening degree (the second opening degree) different from the certain opening degree at the predetermined timing.

In one of embodiments of the apparatus for determining an abnormality of a control valve which can change the opening degree of the first control valve as described above, the first control valve may be configured so as to include "first control valve driving means for varying the opening degree of the first control valve to change the flow passage area of the first passage section in response to an instruction signal", and the control valve abnormality determination means may be configured so as to "change the opening degree of the first control valve by sending the instruction signal to the first control valve driving means".

Further, a torque variation and the like, which an operator of the engine does not expect, may occur, when the control valve abnormality determination means changes the opening degree of the first control valve as described above.

In view of the above, it is preferable that the abnormality determining condition be a condition that is satisfied at least when "the engine is operated in a deceleration state in which a torque required for the engine is smaller than or equal to a predetermined torque".

Even if the opening degree of the first control valve is changed when the engine is being operated in "the deceleration state", the output torque variation of the engine may occur, however, it is unlikely that the operator realizes such a torque variation as the unexpected/unintentional torque variation. Accordingly, the apparatus for determining an abnormality of a control valve of the present invention can determine whether or not the second control valve (and further the first control valve) is abnormal while retaining an excellent comfortability in riding.

BEST MODE FOR CARRYING OUT THE INVENTION

Next will be described embodiments of an apparatus for determining an abnormality of a control valve according to the present invention with reference to the drawings.

A First Embodiment

An Outline of an Apparatus

Figure 1:
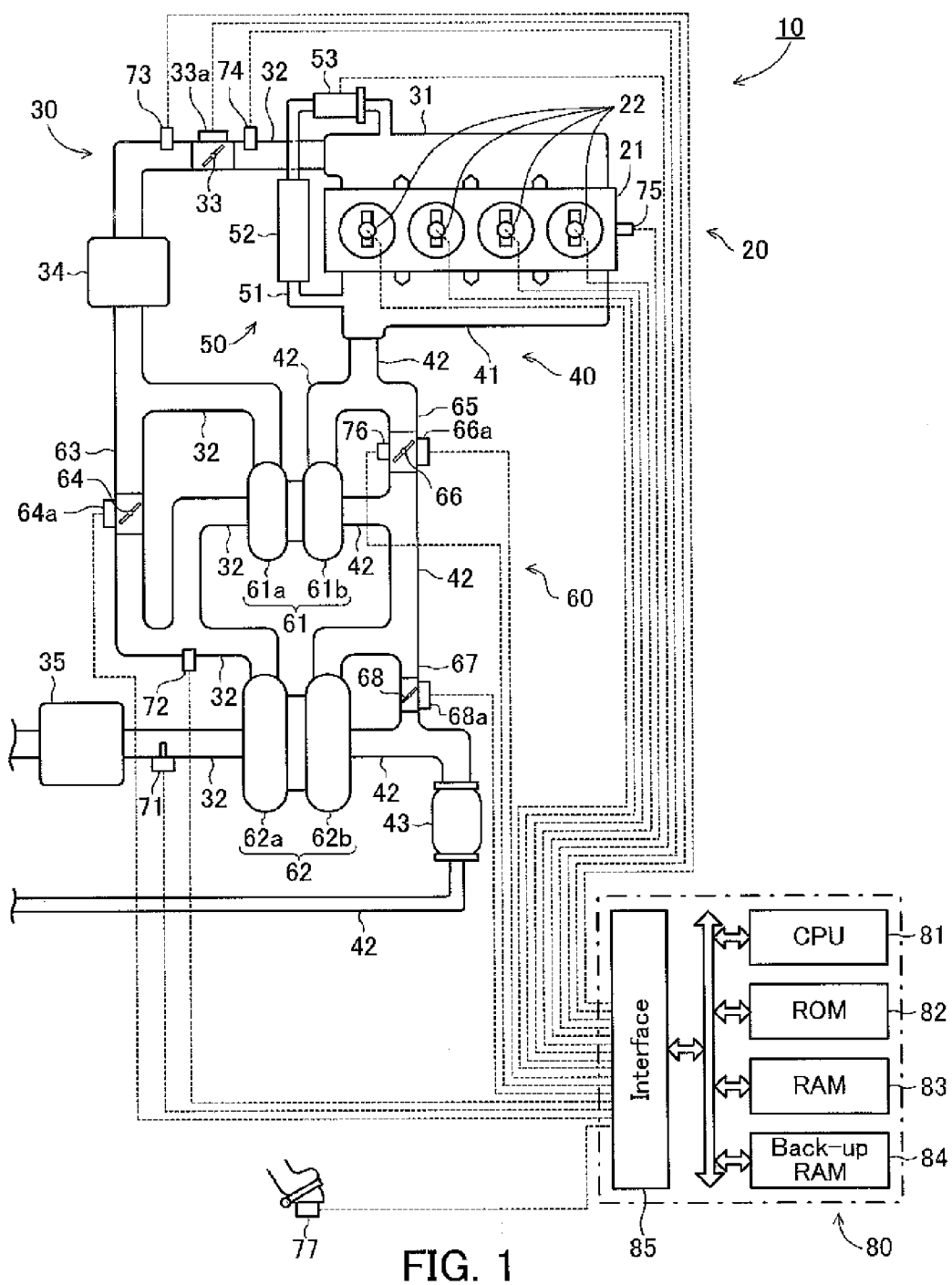
FIG. 1 is a schematic diagram of an internal combustion engine to which a control apparatus of a present invention is applied.

FIG. 1 shows a schematic configuration of a system including an internal combustion engine 10 to which an apparatus for determining an abnormality of a control valve (hereinafter, this apparatus will be referred to as "a first apparatus") according to a first embodiment of the present invention is applied. The engine 10 is a four cylinder diesel engine.

The engine 10 comprises: an engine main body 20 including a fuel supply system; an intake system 30 for introducing an air into the engine main body 20; an exhaust system 40 for emitting an exhaust gas from the engine main body 20 to the outside; an EGR apparatus 50 for recirculating the exhaust gas to a side of the intake system 30; and supercharging apparatus 60 for compressing an air introduced into the engine main body 20 by being driven by an energy of the exhaust gas.

The engine main body 20 comprises a cylinder head 21 with which the intake system 30 and the exhaust system 40 are connected. The cylinder head 21 comprises a plurality of fuel injection devices 22, each of which is disposed at an upper portion of a corresponding cylinder. Each of the fuel injection devices 22 is communicated with a fuel tank (not shown) so as to inject a fuel directly into a combustion chamber of each of the cylinders in response to an instruction signal from an electrical control apparatus 80.

The intake system 30 includes: an intake manifold 31 communicated with each of the cylinders through intake ports (not shown) provided in the cylinder head 21; an intake pipe 32 connected to an upstream merged portion of the intake manifold 31; a throttle valve 33, in the intake pipe 32, for varying a cross-sectional opening area of an intake air passage; a throttle valve actuator 33a for rotatably driving the throttle valve 33 in response to an instruction signal from the electrical control apparatus 80; an intercooler 34 disposed in the intake pipe 32 at an upstream side of the throttle valve 33; and an air cleaner 35 disposed at an end potion of the intake pipe 32 which is an upstream side of the supercharging apparatus 60 disposed at an upstream side of the intercooler 34. The intake manifold 31 and the intake pipe 32 constitute the intake air passage.

The exhaust system 40 comprises: an exhaust manifold 41 communicated with each of the cylinders through exhaust ports (not shown) provided in the cylinder head 21; an exhaust pipe 42 connected to a downstream merged portion of the exhaust manifold 41; and a well-known catalytic converter for purifying the exhaust gas (DPNR) 43 disposed in the exhaust pipe 42 at a downstream side of the supercharging apparatus 60 disposed in the exhaust pipe 42. The exhaust manifold 41 and the exhaust pipe 42 constitute an exhaust gas passage.

The EGR apparatus 50 comprises: an exhaust gas recirculation pipe 51 constituting a passage (an EGR passage) for recirculating the exhaust gas from the exhaust manifold 41 to the intake manifold 31; an EGR gas cooling apparatus (an EGR cooler) 52 disposed in the exhaust gas recirculation pipe 51; and an EGR control valve 53 disposed in the exhaust gas recirculation pipe 51. The EGR control valve 53 is configured so as to be able to vary an amount of the exhaust gas which is recirculated from the exhaust manifold 41 to the intake manifold 31 in response to an instruction signal from the electrical control apparatus 80.

The supercharging apparatus 60 comprises: a high pressure supercharger (turbocharger) 61 serving as a first supercharger; and a low pressure supercharger (turbocharger) 62 serving as a second supercharger. That is, the supercharging apparatus 60 comprises a plurality (two) of superchargers.

The high pressure supercharger 61 comprises a high pressure compressor 61a and a high pressure turbine 61b. The high pressure compressor 61a will be referred to as a first compressor. The high pressure compressor 61a is disposed in the intake air passage (intake pipe 32). The high pressure turbine 61b will be referred to as a first turbine. The high pressure turbine 61b is disposed in the exhaust gas passage (exhaust pipe 42). The high pressure compressor 61a and the high pressure turbine 61b are connected with each other coaxially rotatably through a rotor shaft (not shown). Accordingly, when the high pressure turbine 61b is driven by the exhaust gas, the high pressure compressor 61a rotates to compress an air introduced into the high pressure compressor 61a (i.e., supercharge the engine 10).

The low pressure supercharger 62 comprises a low pressure compressor 62a and a low pressure turbine 62b. The low pressure compressor 62a will be referred to as a second compressor. The low pressure compressor 62a is disposed in the intake air passage (intake pipe 32) at an upstream side of the high pressure compressor 61a. The low pressure turbine 62b is disposed in the exhaust gas passage (exhaust pipe 42) at a downstream side of the high pressure turbine 61b. The low pressure compressor 62a and the low pressure turbine 62b are connected with each other coaxially rotatably through a rotor shaft (not shown). Accordingly, when the low pressure turbine 62b is driven by the exhaust gas, the low pressure compressor 62a rotates to compress an air introduced into the low pressure compressor 62a (i.e., supercharge the engine 10). In this manner, the high pressure supercharger 61 and the low pressure supercharger 62 are connected in series with each other.

Further, a capacity of the low pressure supercharger 62 is larger than a capacity of the high pressure supercharger 61. Accordingly, a choked flow rate of the low pressure supercharger 62 is larger than a choked flow rate of the high pressure supercharger 61, and a surge flow rate of the low pressure supercharger 62 is larger than a surge flow rate of the high pressure supercharger 61. In other words, a minimum magnitude of energy required for supercharging the engine by the high pressure supercharger 61 is smaller than a minimum magnitude of energy required for supercharging the engine by the low pressure supercharger 62.

Consequently, the high pressure supercharger 61 and the low pressure supercharger 62 can supercharge the engine mainly by the high pressure supercharger 61 in a low load operating area, and supercharge the engine mainly by the low pressure supercharger 62 in a high load operating area. Accordingly, a new air is appropriately compressed (the engine is appropriately supercharged) in a wider operating (load) area by the high pressure supercharger 61 and the low pressure supercharger 62.

Further, the supercharging apparatus 60 comprises: a high-pressure-compressor-bypass-passage-section (bypass pipe) 63; an intake air changeover valve (ACV) 64; a high-pressure-turbine-bypass-passage-section (bypass pipe) 65; an exhaust gas changeover valve (ECV) 66; a low-pressure-turbine-bypass-passage (bypass pipe) 67; and an exhaust gas bypass valve (EBV) 68.

One end of the high-pressure-compressor-bypass-passage-section 63 is connected to the intake air passage (intake pipe 32) between the high pressure compressor 61a and the low pressure compressor 62a. The other end of the high-pressure-compressor-bypass-passage-section 63 is connected to the intake air passage (intake pipe 32) at a downstream side of the high pressure compressor 61a. That is, the high-pressure-compressor-bypass-passage-section 63 constitutes a passage which bypasses the high pressure compressor 61a. The high-pressure-compressor-bypass-passage-section 63 will be referred to as "a second passage section", for convenience.

The intake air changeover valve 64 is a butterfly valve disposed in the high-pressure-compressor-bypass-passage-section 63. The intake air changeover valve 64 is configured in such a manner that an opening degree (operating amount) of the valve 64 is varied by an intake air changeover valve actuator 64a which is driven in response to an instruction from the electric control apparatus 80. The intake air changeover valve 64 changes a flow passage area of the high-pressure-compressor-bypass-passage-section 63 in accordance with a change in the opening degree to thereby change a ratio between an amount of the air introduced into the high pressure compressor 61a and an amount of the air passing through the high-pressure-compressor-bypass-passage-section 63. The intake air changeover valve 64 will be referred to as "a second control valve", for convenience.

One end of the high-pressure-turbine-bypass-passage-section 65 is connected to the exhaust gas passage (exhaust pipe 42) at an upstream side of the high pressure turbine 61b. The other end of the high-pressure-turbine-bypass-passage-section 65 is connected to the exhaust gas passage (exhaust pipe 42) between the high pressure turbine 61b and the low pressure turbine 62b. That is, the high-pressure-turbine-bypass-passage-section 65 constitutes a passage which bypasses the high pressure turbine 61b. The high-pressure-turbine-bypass-passage-section 65 will be referred to as "a first passage section", for convenience.

The exhaust gas changeover valve 66 is a butterfly valve disposed in the high-pressure-turbine-bypass-passage-section 65. The exhaust gas changeover valve 66 is configured in such a manner that an opening degree (operating amount) of the valve 66 is varied by an exhaust gas changeover valve actuator 66a which is driven in response to an instruction from the electric control apparatus 80. The exhaust gas changeover valve 66 changes a flow passage area of the high-pressure-turbine-bypass-passage-section 65 in accordance with a change in the opening degree to thereby change a ratio between an amount of the gas introduced into the high pressure turbine 61b and an amount of the gas passing through the high-pressure-turbine-bypass-passage-section 65. The exhaust gas changeover valve 66 will be referred to as "a first control valve", for convenience.

One end of the low-pressure-turbine-bypass-passage-section 67 is connected to the exhaust gas passage (exhaust pipe 42) at an upstream side of the low pressure turbine 62b. The other end of the low-pressure-turbine-bypass-passage-section 67 is connected to the exhaust gas passage (exhaust pipe 42) at a downstream side of the low pressure turbine 62b. That is, the low-pressure-turbine-bypass-passage-section 67 constitutes a passage which bypasses the low pressure turbine 62b. The low-pressure-turbine-bypass-passage-section 67 will be referred to as "a third passage section", for convenience.

The exhaust gas bypass valve 68 is a butterfly valve disposed in the low-pressure-turbine-bypass-passage-section 67. The exhaust gas bypass valve 68 is configured in such a manner that an opening degree (operating amount) of the valve 68 is varied by an exhaust gas bypass valve actuator 68a which is driven in response to an instruction from the electric control apparatus 80. The exhaust gas bypass valve 68 changes a flow passage area of the low-pressure-turbine-bypass-passage-section 67 in accordance with a change in the opening degree to thereby change a ratio between an amount of the gas introduced into the low pressure turbine 62b and an amount of the gas passing through the low-pressure-turbine-bypass-passage-section 67. The exhaust gas bypass valve 68 will be referred to as "a third control valve", for convenience.

Further, the first apparatus comprises a hot wire airflow meter 71, a between-compressors-pressure sensor 72, an intake air temperature sensor 73, a supercharging pressure sensor 74, a crank position sensor 75, an exhaust gas changeover valve opening degree sensor 76, and an accelerator opening degree sensor 77.

The airflow meter 71 is configured so as to output a signal indicative of a mass flow rate Ga of the intake air flowing in the intake pipe 32 (the mass flow rate Ga being an amount of an air introduced into the engine 10 per unit time and referred simply to as "a flow rate").

The between-compressors-pressure sensor 72 is configured so as to output a signal indicative of a pressure (between-compressors-pressure) in the intake pipe 32 between the high pressure compressor 61a and the low pressure compressor 62a. It should be noted that the between-compressors-pressure sensor 72 may be disposed in the high-pressure-compressor-bypass-passage-section 63 at the upstream side of the intake air changeover valve 64.

The intake air temperature sensor 73 is configured so as to output a signal indicative of a temperature of the air flowing in the intake pipe 32.

The supercharging pressure sensor 74 is disposed in the intake pipe 32 at a downstream side of the throttle valve. The supercharging pressure sensor 74 is configured so as to output a signal indicative of a pressure Pim of an air in the intake pipe 32 at a position at which the supercharging pressure sensor 74 is disposed. That is, the supercharging pressure sensor 74 outputs a signal indicative of the pressure (supercharging pressure) Pim of the air introduced into combustion chambers of the engine 10.

The crank position sensor 75 is configured so as to output a signal which includes a narrow pulse generated every time a crank shaft (not shown) rotates 10° and a wide pulse generated every time the crank shaft rotates 360°.

The exhaust gas changeover valve opening degree sensor 76 is configured so as to output a signal indicative of an opening degree Oecv of the exhaust gas changeover valve 66.

The accelerator opening degree sensor 77 is configured so as to output a signal indicative of an opening degree Accp of an accelerator pedal AP operated by a driver.

The electric control apparatus 80 is a microcomputer, which includes the following mutually bus-connected elements: a CPU 81; a ROM 82; a RAM 83; a backup RAM 84 which stores data while power is held on and which retains the stored data even while power is held off; and an interface 85 including an AD converter.

The interface 85 is connected to the sensors etc., so as to send signals from each of the sensors to the CPU 81. Further, in accordance with instructions from the CPU 81, the interface 85 sends drive signals (instruction signals) to the fuel injection devices 22, and each of the actuators (the changeover valve actuator 64a, the exhaust gas changeover valve actuator 66a, and the exhaust gas bypass valve actuator 68a, and the like).

<An Outline of Operations of the Apparatus>

Next will be described the outline of operations of the first apparatus.

The first apparatus determines "a turbo mode" which represents an operating state of the supercharging apparatus 60 (the high pressure supercharger 61 and the low pressure supercharger 62) depending on an operating condition/state of the engine 10. Further, the first apparatus sends to the exhaust gas changeover valve actuator 66a an instruction signal to change the opening degree of the exhaust gas changeover valve 66 to "a predetermined opening degree for a determination", when a predetermined abnormality determining condition is satisfied.

In addition, the first apparatus compares a supercharging pressure at a timing "before" the instruction signal is sent to the exhaust gas changeover valve actuator 66a with a supercharging pressure at a timing "after" the instruction signal is sent to the exhaust gas changeover valve actuator 66a to thereby determine "whether or not the intake air changeover valve 64 is abnormal" and "whether or not the exhaust gas changeover valve 66 is abnormal".

Further, in a case where the first apparatus determines that the intake air changeover valve 64 or the exhaust gas changeover valve 66 is abnormal, the first apparatus notifies the operator of the engine 10 accordingly, and performs "an emergency operation" in which a load given to the members constituting the engine 10 is low. In the meanwhile, in a case where all control valves are normal, the first apparatus provides no notification to the operator and performs "a normal operation". These are the outline of the operations of the first apparatus.

<How to Determine the Turbo Mode>

Next will be described the turbo mode which the first apparatus adopts and the way to determine the turbo mode, before actual operations of the present invention are described.

As described above, an amount of energy of the exhaust gas which allows the high pressure supercharger 61 to operate (to supercharge the engine) is smaller than an amount of energy of the exhaust gas which allows the low pressure supercharger 62 to operate (to supercharge the engine). Therefore, the first apparatus controls the exhaust gas changeover valve 66 in such a manner that the exhaust gas is preferentially supplied to the high pressure supercharger 61, when the energy of the exhaust gas is small (i.e., when the load of the engine is small and the flow rate Ga is small). To the contrary, the first apparatus controls the exhaust gas changeover valve 66 in such a manner that the exhaust gas is preferentially supplied to the low pressure supercharger 62, when the energy of the exhaust gas is large (i.e., when the load of the engine is large and the flow rate Ga is large).

Further, the first apparatus controls the intake air changeover valve 64 so as to adjust the amount of the air supplied to the high pressure supercharger 61. In addition, the first apparatus controls the exhaust gas bypass valve 68 so as to adjust the magnitude of the energy of the exhaust gas supplied to the low pressure supercharger 62.

That is, the first apparatus controls the intake air changeover valve 64, the exhaust gas changeover valve 66, and the exhaust gas bypass valve 68 (hereinafter, these valves will be referred to as "each control valve") in such a manner that the an appropriate amount of the exhaust gas and an appropriate amount of the air are supplied to the high pressure supercharger 61 and the low pressure supercharger 62 in accordance with the operating condition of the engine 10.

In order to perform such a control, the first apparatus divides operating conditions of the engine 10 into four areas (operating areas), and determines operating states of the intake air changeover valve 64, the exhaust gas changeover valve 66, and the exhaust gas bypass valve 68, the operating states being suitable for each of the four operating areas. "The operating state of each control valve" is determined based on a turbo mode.

The turbo mode is determined as follows.

Figure 2:
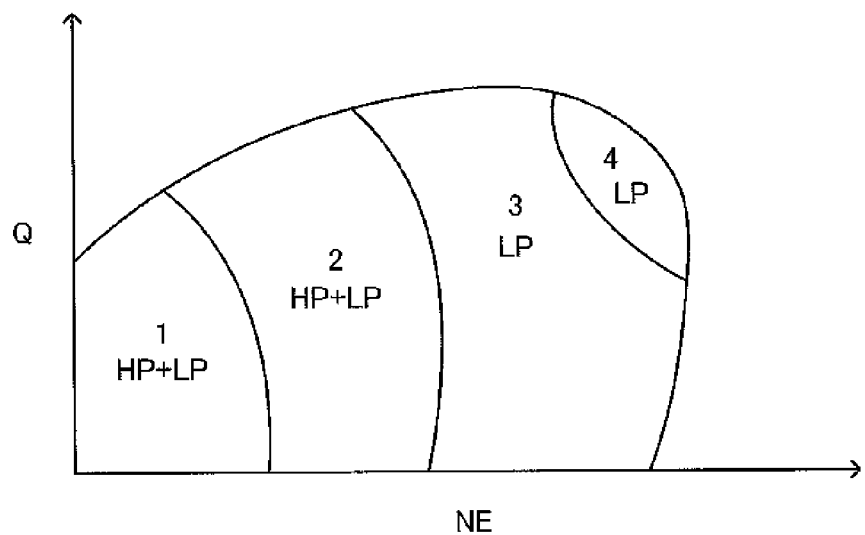
FIG. 2 is a schematic figure showing a relation among an engine rotational speed, a fuel injection amount, and a turbo mode, adopted by the control apparatus of the present invention.

As shown in FIG. 2(A), the first apparatus stores, in the ROM 82, a turbo mode table "MapTurbo (NE, Q)" which defines a relation among "an engine rotational speed NE, a fuel injection amount Q, a the turbo mode" in advance. Each of the figures "1" to "4" shown in FIG. 2(A) indicates a turbo mode number. "HP+LP" shown in FIG. 2(A) indicates that both of the high pressure supercharger 61 and the low pressure supercharger 62 are operated, and "LP" indicates that the low pressure supercharger 62 is preferentially operated.

FIG. 2(B) shows an operating state of each control valve in the each turbo mode. In FIG. 2(B), the "fully close" indicates that an opening degree of the control valve is set at an opening degree to shut down (completely close) a passage in which the control valve is disposed, so that the passage is in a condition where the air or the exhaust gas can not pass through the passage. On the other hand, the "fully open" indicates that the opening degree of the control valve is set at an opening degree to completely/fully open (to its maximum) the passage in which the control valve is disposed, so that the passage is in a condition where the air or the exhaust gas can pass through the passage without being substantially affected by the control valve. The "open" indicates that the opening degree of the control valve is set at an opening degree between "the fully close" and "the fully open", so that the passage is in a condition where an amount of the air or an amount of the exhaust gas passing through the passage in which the control valve is disposed can be varied depending on the opening degree of the control valve.

It should be noted that, in FIG. 2(B), "ECV" is an abbreviated name of the exhaust gas changeover valve (the first control valve) 66, "ACV" is an abbreviated name of the intake air changeover valve (the second control valve) 64, and "EBV" is an abbreviated name of the exhaust gas bypass valve (the third control valve) 68.

The first apparatus applies an actual engine rotational speed NE and an actual fuel injection amount Q to the turbo mode Table MapTurbo (NE, Q) to thereby determine the turbo mode (the operation state of the each control valve). Thereafter, the first apparatus controls the each control valve in accordance with the determined turbo mode.

<An Abnormality Determination for the Control Valve>

Next will be described methods to determine an abnormality of the control valve in the first apparatus.

The first apparatus makes a determination as to whether or not either one of "the intake air changeover valve 64 and the exhaust gas changeover valve 66" is abnormal, when the engine 10 is operated in an operating area in which the high pressure supercharger 61 mainly supercharges the engine 10. The operating area in which the high pressure supercharger 61 mainly supercharges the engine 10 substantially coincides with operating areas of the turbo mode 1 and the turbo mode 2 described above.

<An Abnormality Determination Method 1>

When the engine 10 is operated in the operating area in which "the high pressure supercharger 61 mainly supercharges the engine 10", the first apparatus provides an instruction (an instruction-for-decreasing-opening-degree) to "decrease" the opening degree of the exhaust gas changeover valve 66 to the exhaust gas changeover valve 66 (in actuality, to the exhaust gas changeover valve actuator 66a). The first apparatus compares the supercharging pressure at the timing before the instruction-for-decreasing-opening-degree is provided with the supercharging pressure at the timing after the instruction-for-decreasing-opening-degree is provided.

Further, the first apparatus determines that "the exhaust gas changeover valve 66 is abnormal", if the supercharging pressure Pim does not change by an amount larger than or equal to the predetermined value when (between before and after) the instruction-for-decreasing-opening-degree is provided. In other words, the first apparatus determines that "the exhaust gas changeover valve 66 is normal", if the supercharging pressure Pim changes (increases, in this case) by the amount larger than or equal to the predetermined value when (between before and after) the instruction-for-decreasing-opening-degree is provided. In addition, the first apparatus determines that "the intake air changeover valve 64 is abnormal", if the supercharging pressure Pim "decreases" when (between before and after) the instruction-for-decreasing-opening-degree is provided to the exhaust gas changeover valve 66. Hereinafter, this determination method will be referred to as "an abnormality determination method 1".

<An Abnormality Determination Method 2>

Furthermore, when the engine 10 is operated in the operating area in which "the high pressure supercharger 61 mainly supercharges the engine 10", the first apparatus provides an instruction (an instruction-for-increasing-opening-degree) to "increase" the opening degree of the exhaust gas changeover valve 66 to the exhaust gas changeover valve 66 (in actuality, to the exhaust gas changeover valve actuator 66a). The first apparatus compares the supercharging pressure at a timing before the instruction-for-increasing-opening-degree is provided with the supercharging pressure at a timing after the instruction-for-increasing-opening-degree is provided.

Thereafter, the first apparatus determines that "the exhaust gas changeover valve 66 is abnormal", if the supercharging pressure Pim does not change by an amount larger than or equal to a predetermined value when (between before and after) the instruction-for-increasing-opening-degree is provided. In other words, the first apparatus determines that "the exhaust gas changeover valve 66 is normal", if the supercharging pressure Pim changes (decreases, in this case) by the amount larger than or equal to the predetermined value when (between before and after) the instruction-for-increasing-opening-degree is provided. In addition, the first apparatus determines that "the intake air changeover valve 64 is abnormal", if the supercharging pressure Pim "increases" when (between before and after) the instruction-for-increasing-opening-degree is provided to the exhaust gas changeover valve 66. Hereinafter, this determination method will be referred to as "an abnormality determination method 2".

The abnormality determination method 1 and the abnormality determination method 2 are different in whether the instruction provided to the exhaust gas changeover valve 66 is the instruction-for-"decreasing"-opening-degree or the instruction-for-"increasing"-opening-degree. However, a principle is common to these abnormality determination methods. Accordingly, next will be described reasons why it is possible to determine either one of "the intake air changeover valve 64 and the exhaust gas changeover valve 66" is abnormal according to the methods in the following order, with reference to the abnormality determination method 1 as a representative example.

It should be noted that, as described above, the abnormality determination methods can be carried out as long as the engine 10 is operated either one of in the turbo mode 1 and in the turbo mode 2. Accordingly, in the following description, it is assumed that the engine 10 is being operated in "the turbo mode 2", for convenience. It should be also noted that the first apparatus does not assume that both of "the intake air changeover valve 64 and the exhaust gas changeover valve 66" become abnormal at the same time. In actuality, it is rare that both of "the intake air changeover valve 64 and the exhaust gas changeover valve 66" become abnormal at the same time. Accordingly, the assumption that both of "the intake air changeover valve 64 and the exhaust gas changeover valve 66" does not become abnormal at the same time is practical.

<The Description Order>

(Case 1) A case where both of "the intake air changeover valve 64 and the exhaust gas changeover valve 66" are operating normally (properly).

(Case 2) A case where the intake air changeover valve 64 is abnormal and the exhaust gas changeover valve 66 is normal.

(Case 3) A case where the exhaust gas changeover valve 66 is abnormal and the intake air changeover valve 64 is normal.

<Description>

(Case 1) A case where both of "the intake air changeover valve 64 and the exhaust gas changeover valve 66" are operating normally.

When the engine is being operated in the turbo mode 2, the exhaust gas changeover valve 66 and the intake air changeover valve 64 are operated in such a manner that the high pressure compressor 61a compresses the air introduced into the high pressure compressor 61a and discharges the compressed air, and the low pressure compressor 62a compresses the air introduced into the low pressure compressor 62a and discharges the compressed air. More specifically, as shown in FIG. 2(B), in the turbo mode 2, the intake air changeover valve (ACV) 64 is controlled so as to be in "the fully open" state, and the exhaust gas changeover valve (ECV) 66 is controlled so as to be in "the open" state.

Figure 3:
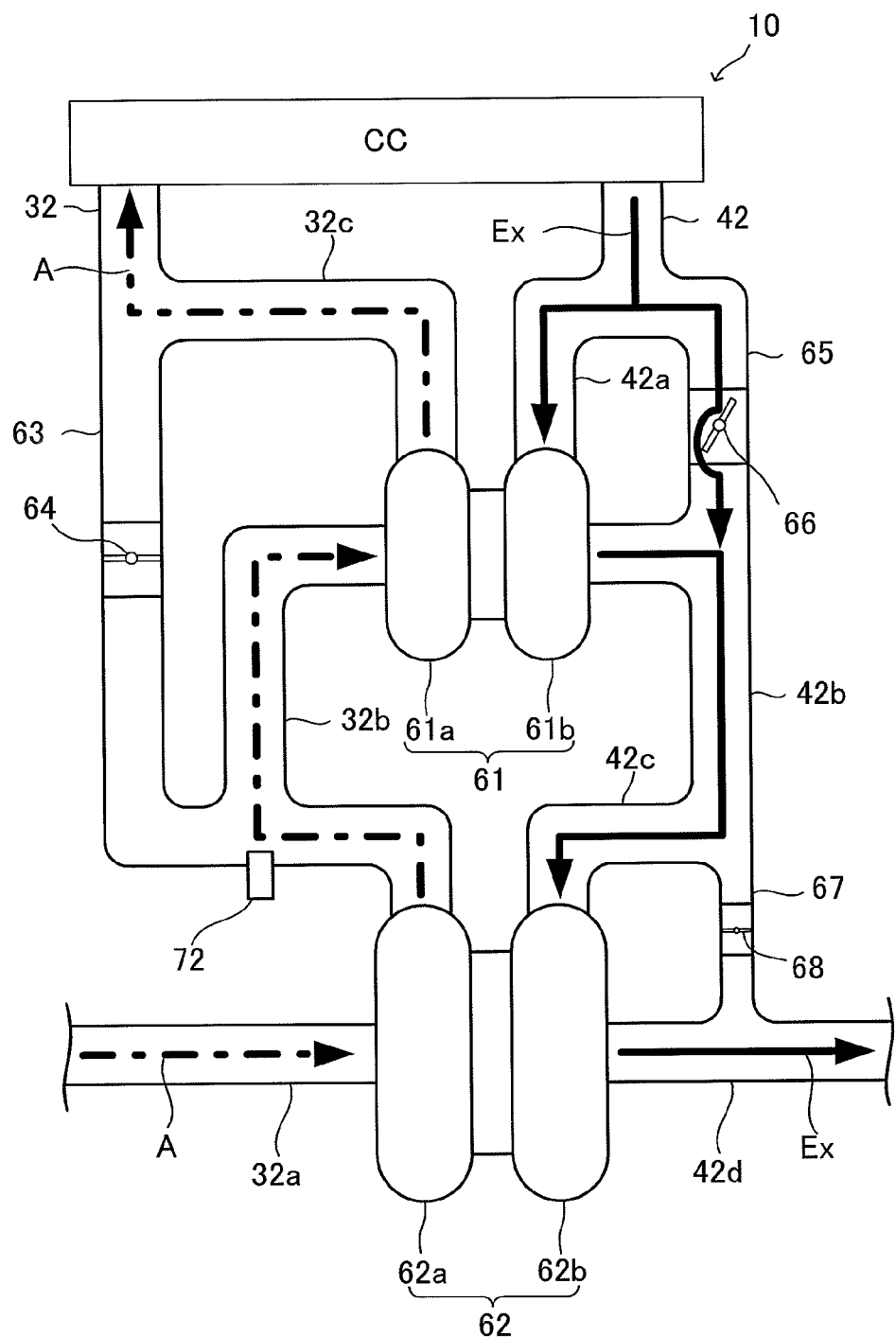
FIG. 3 is a schematic diagram showing one example of an intake air passage and an exhaust gas passage of an internal combustion engine to which a control apparatus according to an embodiment of the present invention is applied.

FIG. 3 is a schematic view showing how the high pressure compressor 61a compresses the air introduced into the high pressure compressor 61a, and the low pressure compressor 62a compresses the air introduced into the low pressure compressor 62a, in the state described above.

As shown in FIG. 3, a new air A introduced into an intake air passage 32a (a portion of the intake air passage 32) from an outside of the engine 10 reaches the low pressure compressor 62a. Subsequently, the new air A passing through the low pressure compressor 62a reaches the high pressure compressor 61a through an intake air passage 32b (another portion of the intake air passage 32) between the low pressure compressor 62a and the high pressure compressor 61a. Thereafter, the new air A passing through the high pressure compressor 61a is introduced into the combustion chambers CC of the engine 10 through an intake air passage 32c (still another portion of the intake air passage 32).

A part of the exhaust gas discharged from the combustion chambers CC heads to the high pressure turbine 61b after passing through an exhaust gas passage 42a (a portion of the exhaust gas passage 42). The other part of the exhaust gas different from the exhaust gas heading to the high pressure turbine 61b simultaneously heads to the exhaust gas changeover valve 66 after passing through the high-pressure-turbine-bypass-passage-section 65. The part of the exhaust gas Ex which heads to the high pressure turbine 61b passes through the high pressure turbine 61b, and thereafter merges with the other part of the exhaust gas Ex passing through the exhaust gas changeover valve 66. Subsequently, the merged exhaust gas Ex reaches the low pressure turbine 62b after passing through an exhaust gas passage 42b (another portion of the exhaust gas passage 42) between the high pressure turbine 61b and the low pressure turbine 62b. Thereafter, the exhaust gas Ex passing through the low pressure turbine 62b is discharged through an exhaust gas passage 42d (still another portion of the exhaust gas passage 42) to the outside of the engine 10.

Consequently, the high pressure turbine 61b is driven by the energy of "the exhaust gas Ex passing through the high pressure turbine 61b", and the high pressure compressor 61a is thereby driven. As a result, the high pressure compressor 61a compresses "the new air A passing through the high pressure compressor 61a".

At the same time, the low pressure turbine 62b is driven by the energy of "the exhaust gas Ex passing through the low pressure turbine 62b", and the low pressure compressor 62a is thereby driven. As a result, the low pressure compressor 62a compresses "the new air A passing through the low pressure compressor 62a".

It should be noted that the first apparatus performs a feedback control of the exhaust gas changeover valve 66 in the turbo mode 2 in such a manner that the supercharging pressure Pim which is obtained from the supercharging pressure sensor 74 coincides with a target supercharging pressure which is determined in accordance with the operating condition of the engine 10.

In this manner, when both of the intake air changeover valve 64 and the exhaust gas changeover valve 66 operate normally, both of the high pressure compressor 61a and the low pressure compressor 62a can compress the new air A.

As described above, the first apparatus performs the abnormality determination by providing the instruction-for-decreasing-opening-degree to the exhaust gas changeover valve 66, and by comparing the supercharging pressure at the timing before the instruction-for-decreasing-opening-degree is provided with the supercharging pressure at the timing after the instruction-for-decreasing-opening-degree is provided. Therefore, a change in the supercharging pressure when the opening degree of the exhaust gas changeover valve 66 is changed (decreased) will be described with reference to a time-line chart shown in FIG. 4.

Figure 4:
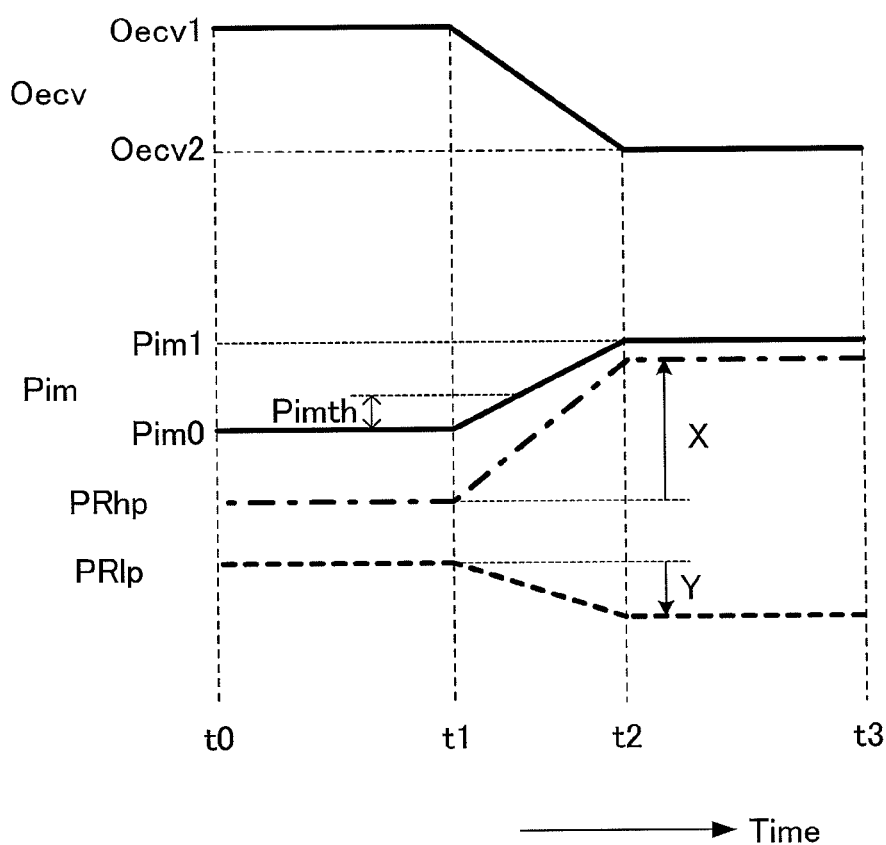
FIG. 4 is a time-line chart showing a change in a supercharging pressure with respect to a change in an opening degree of an exhaust gas changeover valve in the internal combustion engine shown in FIG. 3.

FIG. 4 is the time-line chart showing a relation among the opening degree Oecv of the exhaust gas changeover valve 66, the supercharging pressure Pim, a pressure ratio of the high pressure supercharger PRhp, and a pressure ratio of the low pressure supercharger PRlp. The pressure ratio of the high pressure supercharger PRhp is a ratio of "a pressure of the new air A immediately after the new air A has passed through the high pressure compressor 61a" to "a pressure of the new air A immediately before the new air A is introduced into the high pressure compressor 61a" The pressure ratio of the low pressure supercharger PRlp is a ratio of "a pressure of the new air A immediately after the new air A has passed through the low pressure compressor 62a" to "a pressure of the new air A immediately before the new air A is introduced into the low pressure compressor 62a". Accordingly, the supercharging pressure Pim varies in accordance with "a product of the pressure ratio of the high pressure supercharger PRhp and the pressure ratio of the low pressure supercharger PRlp".

In the example shown in FIG. 4, the opening degree Oecv of the exhaust gas changeover valve 66 is kept at a certain opening degree Oecv1 for a period from time t0 to time t1. During this period, each of the supercharging pressure Pim, the pressure ratio of the high pressure supercharger PRhp, and the pressure ratio of the low pressure supercharger PRlp is kept at a respective certain value.

Subsequently, the first apparatus sends to the exhaust gas changeover valve 66 at the time t1 an instruction to change the opening degree of the exhaust gas changeover valve 66 to an opening degree Oecv2. As a result, the opening degree Oecv of the exhaust gas changeover valve 66 starts to decrease from the opening degree Oecv1 at the time t1, and reaches the opening degree Oecv2 at time t2. Further, the first apparatus keeps the opening degree Oecv of the exhaust gas changeover valve 66 at the opening degree Oecv2 after the time t2.

When the opening degree Oecv of the exhaust gas changeover valve 66 decreases as described above, the amount of the exhaust gas Ex which can pass through the high-pressure-turbine-bypass-passage-section 65 decreases, and the amount of the exhaust gas Ex which heads to the high pressure turbine 61b increases. This increases the energy of the exhaust gas Ex supplied to the high pressure turbine 61b, and thereby the pressure ratio of the high pressure supercharger PRhp "increases".

On the other hand, the amount of the exhaust gas Ex which can pass through the high-pressure-turbine-bypass-passage-section 65 decreases, when the opening degree Oecv of the exhaust gas changeover valve 66 decreases. Accordingly, the amount of the exhaust gas Ex which directly flowing into the low pressure turbine 62b decreases. This decreases the energy supplied to the low pressure turbine 62b, and the pressure ratio of the low pressure supercharger PRlp thereby "decreases".

As described above, the current operating condition is in the turbo mode 2, and is in the state in which the high pressure supercharger 61 can compress the new air more efficiently than the low pressure supercharger 62 (i.e., the state where the high pressure supercharger 61 mainly supercharge the engine). Accordingly, as shown in FIG. 4, when the opening degree Oecv of the exhaust gas changeover valve 66 decreases, an increasing amount (X) in the pressure ratio of the high pressure supercharger PRhp becomes larger than a decreasing amount (Y) in the pressure ratio of the low pressure supercharger PRlp. Consequently, the supercharging pressure Pim which varies in accordance with the product of the pressure ratio of the high pressure supercharger PRhp and the pressure ratio of the low pressure supercharger PRlp "increases" by an amount larger than or equal to a threshold supercharging pressure Pimth.

As described above, in the case where both of the exhaust gas changeover valve 66 and the intake air changeover valve 64 "operate normally", the supercharging pressure Pim "increases" by the amount larger than or equal to the threshold supercharging pressure Pimth, when the opening degree Oecv of the exhaust gas changeover valve 66 is "decreased". It can be understood from the above description that the supercharging pressure Pim "decreases" by the amount larger than or equal to the threshold supercharging pressure Pimth, when the opening degree Oecv of the exhaust gas changeover valve 66 is "increased".

(Case 2) A case where the intake air changeover valve 64 is abnormal and the exhaust gas changeover valve 66 is normal.

Next will be described a case where "the intake air changeover valve 64" is abnormal among the intake air changeover valve 64 and the exhaust gas changeover valve 66, with reference to FIG. 5. As described above, in the case where the engine 10 is being operated in the turbo mode 2, the intake air changeover valve 64 must be in "the fully close" state, if the intake air changeover valve 64 operates normally. Accordingly, hereinafter, a description will be continued based on an assumption that "an abnormal state is occurring in which the opening degree of the intake air changeover valve 64 is larger than or equal to a certain opening degree which causes the intake air changeover valve 64 to produce no throttle effect (e.g., "the fully open")⇔. Hereinafter, this abnormal state will be referred to as "an abnormal open state".

Figure 5:
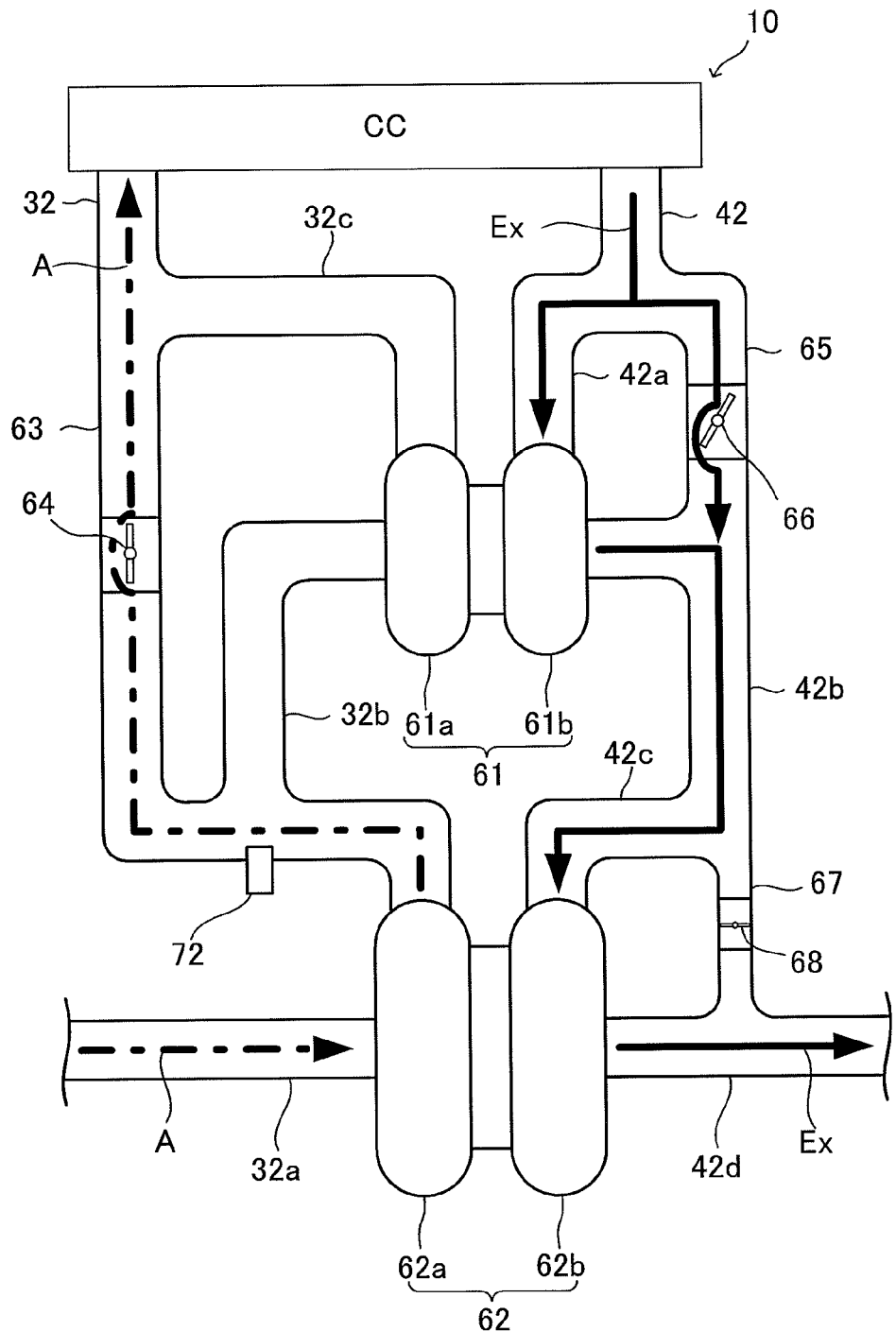
FIG. 5 is a schematic diagram showing another example of an intake air passage and an exhaust gas passage of the internal combustion engine to which the control apparatus according to the embodiment of the present invention is applied.

In this state, as shown in FIG. 5, the exhaust gas discharged from the combustion chambers CC is emitted to the outside of the engine 10 via passages similar to ones in "the Case 1" described above. That is, the exhaust gas Ex is discharged to the outside of the engine 10 through the high pressure turbine 61b and the low pressure turbine 62b.

Accordingly, the high pressure turbine 61b is driven. In addition, high pressure compressor 61a is thereby driven. At the same time, the low pressure turbine 62b is driven. The low pressure compressor 62a is thereby driven.

In the meantime, the new air A introduced from the outside of the engine 10 into the intake air passage 32a reaches the low pressure compressor 62a. Consequently, the low pressure compressor 62a compresses the new air A. However, since the intake air changeover valve 64 is in the abnormal open state, the new air A compressed by the low pressure compressor 62a does not head to the high pressure compressor 61a, and the new air A is introduced into the combustion chambers CC of the engine 10 through the high-pressure-compressor-bypass-passage-section 63. That is, the high pressure compressor 61a can not further compress the new air A compressed by the low pressure compressor 62a. In other words, the engine 10 is supercharged by "the low pressure supercharger 62 only", when the intake air changeover valve 64 is in the abnormal open state.

Next will be described an operation of the first apparatus when it performs the abnormality determination in this state, with reference to a time-line chart shown in FIG. 6. The time-line chart shown in FIG. 6 is similar to the time-line chart shown in FIG. 4 to show a relation among the plurality of the parameters.

Figure 6:
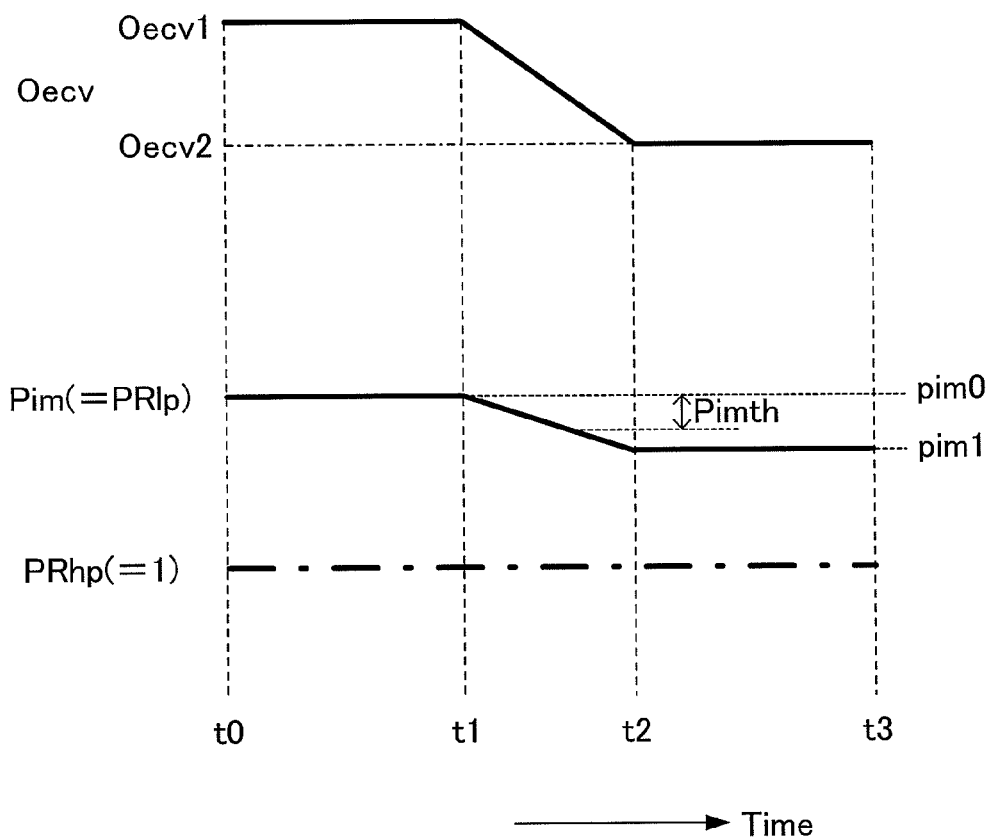
FIG. 6 is a time-line chart showing a change in a supercharging pressure with respect to a change in an opening degree of the exhaust gas changeover valve in the internal combustion engine shown in FIG. 5.

In the example shown in FIG. 6, the opening degree Oecv of the exhaust gas changeover valve 66 is kept at the certain opening degree Oecv1 for a period from time t0 to time t1. As described above, the new air A is not compressed by the high pressure compressor 61a, but the new air A is compressed by the low pressure compressor 62a only. Accordingly, during this period, the pressure ratio of the high pressure supercharger PRhp is "1". Further, the supercharging pressure Pim is therefore equal to the pressure ratio of the low pressure supercharger PRlp.

Subsequently, the first apparatus sends to the exhaust gas changeover valve 66 at the time t1 an instruction to change the opening degree Oecv to the opening degree Oecv2. As a result, the opening degree Oecv of the exhaust gas changeover valve 66 starts to decrease from the opening degree Oecv1 at the time t1, and reaches the opening degree Oecv2 at time t2. Further, the first apparatus keeps the opening degree Oecv of the exhaust gas changeover valve 66 at the opening degree Oecv2 after the time t2.

As described above, when the opening degree Oecv of the exhaust gas changeover valve 66 decreases, the energy of the exhaust gas Ex supplied to the high pressure turbine 61b increases. However, in the present case (the Case 2), the pressure ratio of the high pressure supercharger PRhp remains at "1", since the high pressure compressor 61a can not compress the new air A.

On the other hand, when the opening degree Oecv of the exhaust gas changeover valve 66 decreases, the energy supplied to the low pressure turbine 62b decreases as described above. Accordingly, the pressure ratio of the low pressure supercharger PRlp thereby "decreases". As a result, the supercharging pressure Pim also "decreases".

As described above, in the case where the exhaust gas changeover valve 66 is normal, but "the intake air changeover valve 64 is abnormal", the supercharging pressure Pim decreases, when the opening degree Oecv of the exhaust gas changeover valve 66 is "decreased". It can be understood from the above description that the supercharging pressure Pim "increases", when the opening degree Oecv of the exhaust gas changeover valve 66 is "increased".

(Case 3) A case where the exhaust gas changeover valve 66 is abnormal, and the intake air changeover valve 64 is normal.

Next will be described a case where "the exhaust gas changeover valve 66" is abnormal among the intake air changeover valve 64 and the exhaust gas changeover valve 66. Hereinafter, a description will be continued based on an assumption that "an abnormal state occurs in which the exhaust gas changeover valve 66 can not operate/move" due to an adhesion of the exhaust gas changeover valve 66 and so on, while the engine 10 is being operated in the turbo mode 2. In the turbo mode 2, the high pressure supercharger 61 and the low pressure supercharger 62 operate in the same way as in "the Case 1" described above.

Next will be described an operation of the first apparatus when it performs the abnormality determination in this state, with reference to a time-line chart shown in FIG. 7. The time-line chart shown in FIG. 7 is similar to the time-line chart shown in FIG. 4 to show a relation among the plurality of the parameters.

Figure 7:
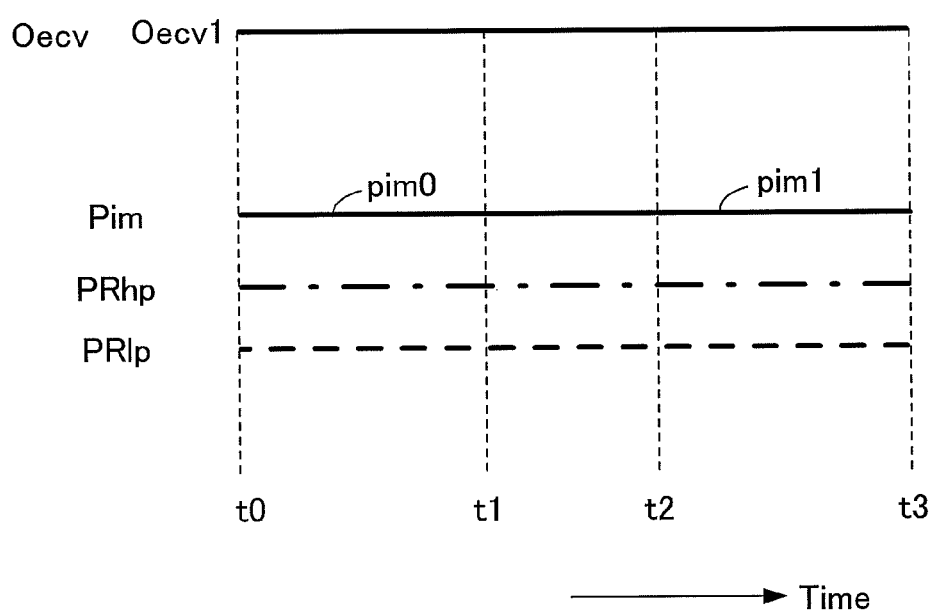
FIG. 7 is another time-line chart showing a change in a supercharging pressure with respect to a change in an opening degree of the exhaust gas changeover valve in the internal combustion engine to which the control apparatus according to the embodiment of the present invention is applied.

In the example shown in FIG. 7, the opening degree Oecv of the exhaust gas changeover valve 66 is kept at the certain opening degree Oecv1 for a period from time t0 to time t1. During this period, each of the supercharging pressure Pim, the pressure ratio of the high pressure supercharger PRhp, and the pressure ratio of the low pressure supercharger PRlp is kept at the respective certain value.

Subsequently, the first apparatus sends to the exhaust gas changeover valve 66 at the time t1 an instruction to change the opening degree of the exhaust gas changeover valve 66 to the opening degree Oecv2. However, the exhaust gas changeover valve 66 can not operate. Accordingly, the opening degree Oecv of the exhaust gas changeover valve 66 is kept at the opening degree Oecv1 after the time t1. Consequently, the pressure ratio of the high pressure supercharger PRhp and the pressure ratio of the low pressure supercharger PRlp remain unchanged when (between before and after) the instruction to change the opening degree of the exhaust gas changeover valve 66 to the opening degree Oecv2 is sent. As a result, the supercharging pressure Pim also remains unchanged.

As described above, in the case where the intake air changeover valve 64 is normal, but "the exhaust gas changeover valve 66 is abnormal", the supercharging pressure Pim does not change, even when the instruction to change the opening degree of the exhaust gas changeover valve 66 is provided to the exhaust gas changeover valve 66.

It is understood from the above description that the supercharging pressure Pim changes differently from each other depending on each case of the Case 1 to the Case 3, when the instruction to change the opening degree Oecv of the exhaust gas changeover valve 66 is provided. Accordingly, it is possible to determine whether or not either one of "the intake air changeover valve 64 and the exhaust gas changeover valve 66" is abnormal, according to the abnormality determination methods 1 and 2.

<An Actual Operation>

Next will be described an actual operation of the first apparatus.

Figure 8:
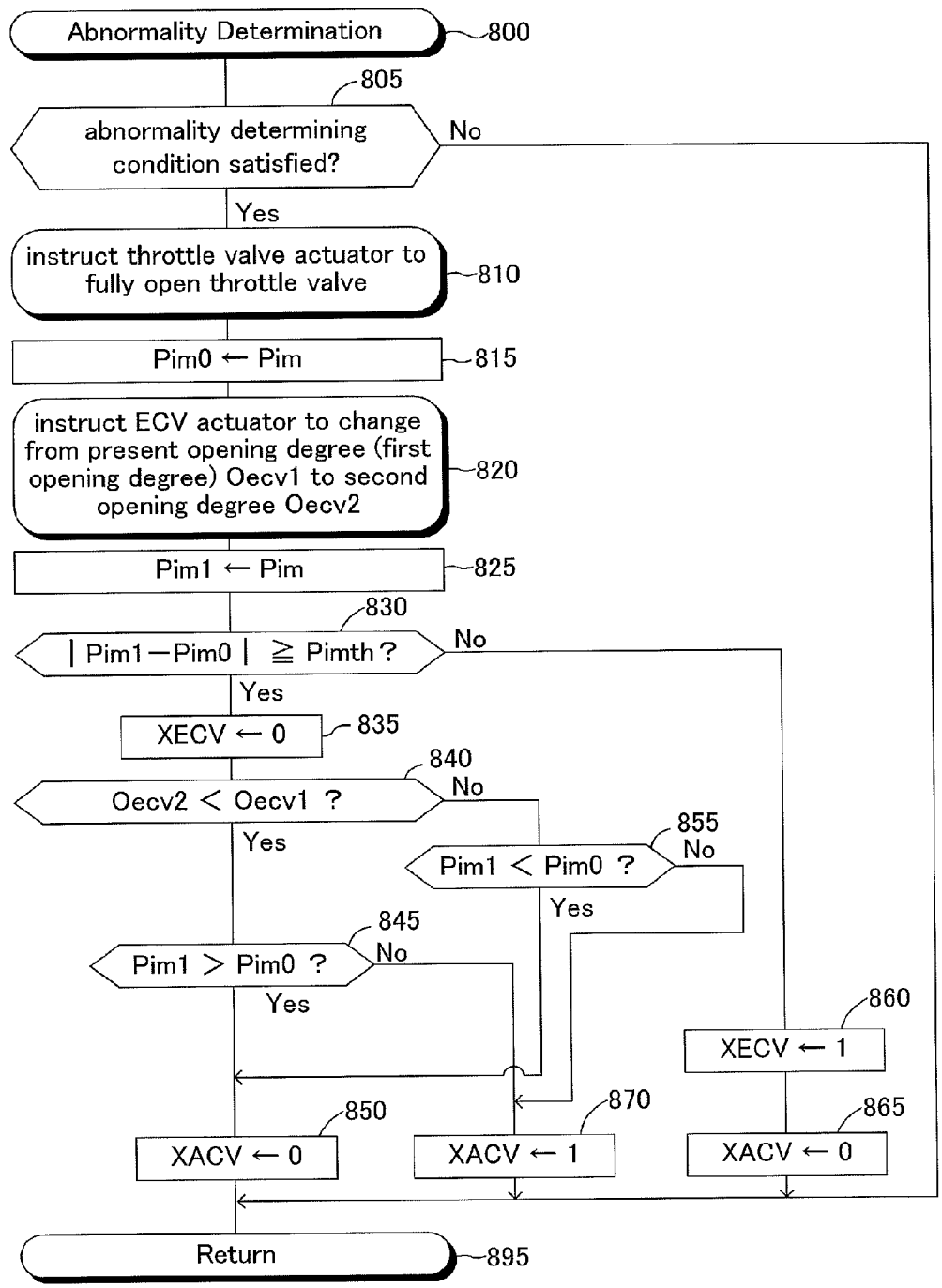
FIG. 8 is a flowchart showing a routine executed by a CPU of the control apparatus according to the embodiment of the present invention.

The CPU 81 executes "an abnormality determination routine" shown by a flowchart in FIG. 8 every elapse of a predetermined time period.

The CPU 81 starts executing the routine from step 800 of FIG. 8 and proceeds to step 805 at which the CPU 81 determines whether or not a predetermined abnormality determining condition is satisfied.

At step 805, the CPU 81 determines that the abnormality determining condition is satisfied when all of the following conditions are satisfied, and determines that the abnormality determining condition is not satisfied when one or more of the following conditions are not satisfied.

(Condition 1) An operating state of the engine 10 is the turbo mode 1 or the turbo mode 2.

(Condition 2) The flow rate (the flow rate of the intake air) Ga is smaller than or equal to a predetermined threshold-flow-rate Gath.

(Condition 3) A torque required for the engine 10 is smaller than or equal to a predetermined threshold-required-torque (the engine 10 is being operated in a deceleration state.).

That is, the abnormality determining condition is satisfied, when both conditions are satisfied, one condition being satisfied when the engine 10 is being operated in the operating area where "the first supercharger" can mainly supercharge the engine 10 among the first supercharger and the second supercharger, and the other condition being satisfied when the engine 10 is being operated in the deceleration state.

It should be noted that only either one of the condition 1 and the condition 2 can be adopted, if the condition 2 is automatically satisfied when the condition 1 is satisfied. In addition, the condition 3 may be omitted. "The predetermined threshold-flow-rate Gath" used in the condition 2 is set at a certain flow rate such that the engine is supercharged mainly by the high pressure supercharger 61 when the flow rate Ga is smaller than or equal to the certain flow rate.

The threshold-flow-rate Gath may be set at a certain flow rate such that the low pressure supercharger 62 does not supercharge the engine when the flow rate Ga is smaller than or equal to the certain flow rate. In this case, it is preferable that the threshold-flow-rate Gath be set at a certain flow rate such that both the high pressure supercharger 61 and the low pressure supercharger 62 supercharge the engine, when the flow rate Ga is larger than or equal to the certain flow rate. Further, the threshold-flow-rate Gath may be set at a certain flow rate such that the high pressure supercharger 61 mainly supercharge the engine and the low pressure supercharger 62 also supercharge the engine, when the flow rate Ga is smaller than or equal to the certain flow rate, although the low pressure supercharger 62 can not mainly supercharge the engine.

The required torque used in the condition 3 can be determined based on "the opening degree Accp of the accelerator pedal", "the engine rotational speed NE", and "the fuel supply amount Q", and so on. In other words, the condition 3 may be a condition which is satisfied when the opening degree Accp of the accelerator pedal is smaller than or equal to a predetermined threshold-opening-degree Accpth, or may be a condition which is satisfied when an operating condition determined by the opening degree Accp of the accelerator pedal and the engine rotational speed NE is in "a predetermined deceleration area defined based on the opening degree Accp of the accelerator pedal and the engine rotational speed NE", or may be a condition which is satisfied when the fuel supply amount Q determined based on the opening degree Accp of the accelerator pedal and the engine rotational speed NE, and so on, is smaller than or equal to "a predetermined threshold fuel supply amount representing the deceleration condition".

Further, the abnormality determining condition may include a condition that "the determination as to whether or not the control valve is abnormal has not been made yet after a start of a current operation (i.e., after an ignition key switch is turned ON from OFF).

If the abnormality determining condition is not satisfied at the present time, the CPU 81 makes a "No" determination at step 805 to proceed directly to step 895 at which the CPU 81 ends the present routine tentatively. On the other hand, if the abnormality determining condition is satisfied at the present time, the CPU 81 makes a "Yes" determination at step 805 to proceed to step 810. At step 810, the CPU 81 provides to the throttle valve actuator 33a an instruction to set the opening degree of the throttle valve 33 to a fully-open opening degree.

Subsequently, the CPU 81 proceeds to step 815 at which the CPU 81 obtains the supercharging pressure Pim at the present time, stores the obtained supercharging pressure Pim as "a referential supercharging pressure Pim0 serving as a first value", and proceeds to step 820. It should be noted that this timing will be referred to as "a first timing", and the opening degree Oecv of the exhaust gas changeover valve 66 at the first timing will be referred to as "a first opening degree Oecv1", for convenience.

Subsequently, at step 820, the CPU 81 provides to the exhaust gas changeover valve actuator 66a an instruction to change the opening degree Oecv of the exhaust gas changeover valve 66 to the second opening degree Oecv2. The CPU 81 thereafter wait till a second timing which comes when a predetermined time period has elapsed from the present time. At step 820, if the first opening degree Oecv1 is smaller than ½ (a half) of "a fully-open-opening-degree OecvMAX which is a maximum opening degree of the exhaust gas changeover valve 66", the CPU 81 sets the second opening degree Oecv2 at "an opening degree (for example, the fully-open-opening-degree OecvMAX) larger than the first opening degree Oecv1". On the other hand, if the first opening degree Oecv1 is larger than or equal to the ½ of "the fully-open-opening-degree OecvMAX of the exhaust gas changeover valve 66", the CPU 81 sets the second opening degree Oecv2 at "an opening degree (for example, the fully-close-opening-degree OecvCLOSE) smaller than the first opening degree Oecv1".

When the second timing comes, the CPU 81 proceeds to step 825 at which the CPU 81 obtains the supercharging pressure Pim at the second timing, and stores the obtained supercharging pressure Pim as "a supercharging-pressure-for-a-determination Pim1 serving as a second value". Subsequently, the CPU 81 proceeds to step 830 at which the CPU 81 determines whether or not an absolute value of a difference between the supercharging-pressure-for-a-determination Pim1 and the referential supercharging pressure Pim0 is larger than or equal to a threshold supercharging pressure Pimth. The threshold supercharging pressure Pimth is also referred to as a first control valve abnormality determination threshold value, and is "a predetermined value larger than or equal to 0" obtained based on experiments in advance.

(Assumption A) When Both of the Exhaust Gas Changeover Valve 66 and the Intake Air Changeover Valve 64 are Normal.

Now, it is assumed that both the exhaust gas changeover valve 66 and the intake air changeover valve 64 are normal. In this case, as described above, the absolute value of the difference between the supercharging-pressure-for-a-determination Pim1 and the referential supercharging pressure Pim0 becomes larger than or equal to the threshold supercharging pressure Pimth.

Accordingly, the CPU 81 makes a "Yes" determination at step 830 to proceed to step 835 at which the CPU 81 sets a value of an exhaust-gas-changeover-valve-abnormality-determination-flag XECV at "0". The exhaust-gas-changeover-valve-abnormality-determination-flag XECV indicates that the exhaust gas changeover valve 66 operates normally, when the value of the flag XECV is "0". The exhaust-gas-changeover-valve-abnormality-determination-flag XECV indicates that the exhaust gas changeover valve 66 is abnormal, when the value of the flag XECV is "1". It should be noted that the value of the exhaust-gas-changeover-valve-abnormality-determination-flag XECV is set at "0" by an initial routine executed when the ignition key switch (not shown) is turned ON from OFF. Further, all of values of flags which the first apparatus uses, the flags including the exhaust-gas-changeover-valve-abnormality-determination-flag XECV, are stored in the back-up RAM 84.

Subsequently, the CPU 81 proceeds to step 840 at which the CPU 81 determines whether or not the second opening degree Oecv2 which is set at step 820 is smaller than the first opening degree Oecv1. When the second opening degree Oecv2 is smaller than the first opening degree Oecv1, the CPU 81 proceeds to step 845 at which the CPU 81 determines whether or not the supercharging-pressure-for-a-determination Pim1 (the second value) is smaller than the referential supercharging pressure Pim0 (the first value).

According to the assumption A described above, the supercharging-pressure-for-a-determination Pim1 is larger than the referential supercharging pressure Pim0, when the second opening degree Oecv2 is smaller than the first opening degree Oecv1 (i.e., when the opening degree Oecv of the exhaust gas changeover valve 66 is decreased) (refer to FIG. 4). Therefore, the CPU 81 makes a "Yes" determination at step 845 to proceed to step 850 at which the CPU 81 sets a value of an intake-air-changeover-valve-abnormality-determination-flag XACV at "0". The intake-air-changeover-valve-abnormality-determination-flag XACV indicates that the intake air changeover valve 64 operates normally, when the value of the flag XACV is "0". The intake-air-changeover-valve-abnormality-determination-flag XACV indicates that the intake air changeover valve 64 is abnormal, when the value of the flag XACV is "1". It should be noted that the value of the intake-air-changeover-valve-abnormality-determination-flag XACV is set at "0" by the initial routine executed when the ignition key switch (not shown) is turned ON from OFF. Thereafter, the CPU 81 proceeds to step 895 at which the CPU 81 ends the present routine tentatively.

On the other hand, when the CPU proceeds to step 840, if the second opening degree Oecv2 is larger than or equal to the first opening degree Oecv1 (i.e., if the opening degree Oecv of the exhaust gas changeover valve 66 is increased), the CPU 81 makes a "No" determination at step 840 to proceed to step 855 at which the CPU 81 determines whether or not the supercharging-pressure-for-a-determination Pim1 is smaller than the referential supercharging pressure Pim0.

In this case (i.e., in the case where the opening degree Oecv of the exhaust gas changeover valve 66 is increased under the assumption A described above), the supercharging-pressure-for-a-determination Pim1 is smaller than the referential supercharging pressure Pim0, as described. Accordingly, the CPU 81 makes a "Yes" determination at step 855 to proceed to step 850 at which the CPU 81 sets the intake-air-changeover-valve-abnormality-determination-flag XACV at "0".

Figure 9:
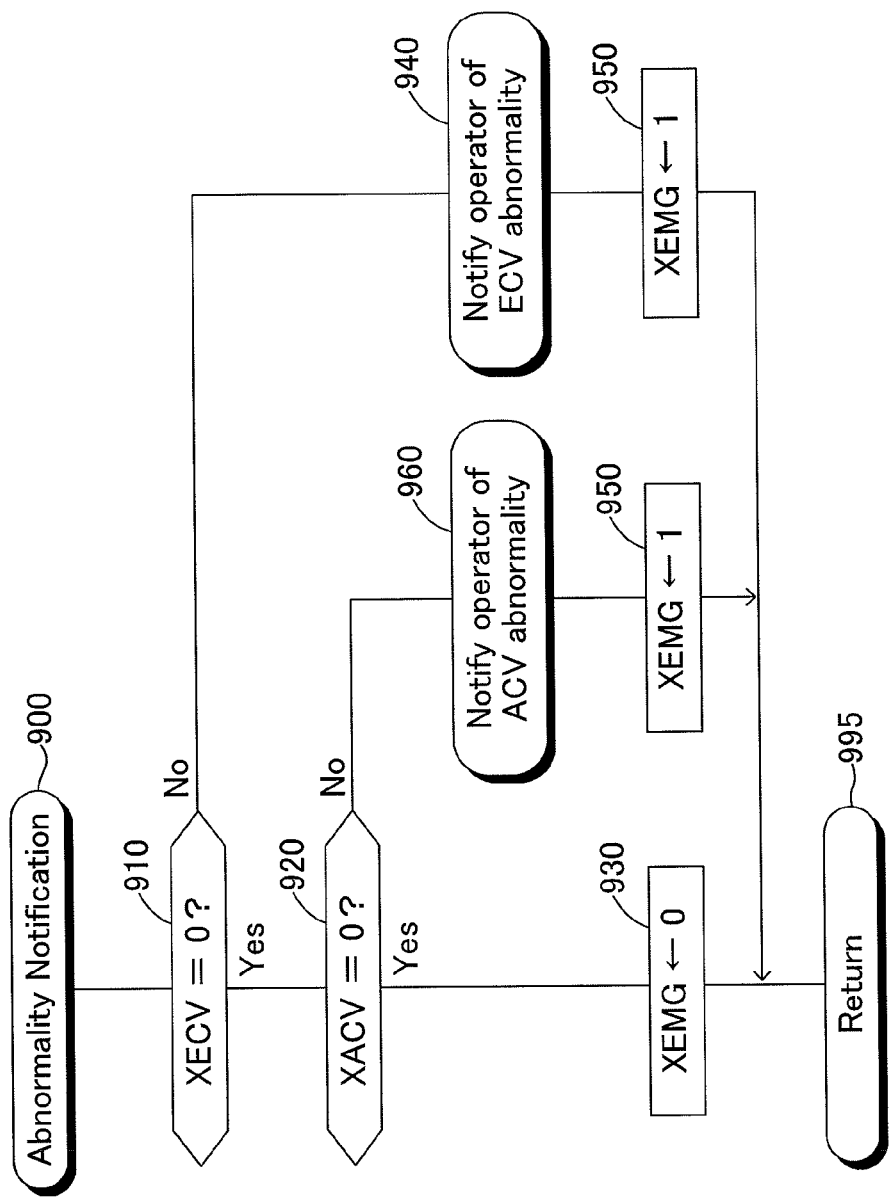
FIG. 9 is a flowchart showing a routine executed by the CPU of the control apparatus according to the embodiment of the present invention.

Further, the CPU 81 executes "an abnormality notifying routine" shown by a flowchart in FIG. 9 every elapse of a predetermined time period. When the intake air changeover valve 64 or the exhaust gas changeover valve 66 is abnormal, the CPU 81 notifies an operator of the engine 10 accordingly, by this routine.

More specifically, the CPU 81 starts executing the routine from step 900 in FIG. 9 and proceeds to step 910 at which the CPU 81 determines whether or not the value of the exhaust-gas-changeover-valve-abnormality-determination-flag XECV is "0". The value of the exhaust-gas-changeover-valve-abnormality-determination-flag XECV is "0" at the present time, the CPU 81 therefore makes a "Yes" determination to proceed to step 920.

Subsequently, at step 920, the CPU 81 determines whether or not the value of the intake-air-changeover-valve-abnormality-determination-flag XACV is "0". The value of the intake-air-changeover-valve-abnormality-determination-flag XACV is "0" at the present time, the CPU 81 therefore makes a "Yes" determination to proceed to step 930.

At step 930, the CPU 81 sets a value of an abnormality-occurrence-flag XEMG at "0". The abnormality-occurrence-flag XEMG indicates that both the intake air changeover valve 64 and the exhaust gas changeover valve 66 operate normally, when the value of the flag XEMG is "0". The abnormality-occurrence-flag XEMG indicates that the intake air changeover valve 64 or the exhaust gas changeover valve 66 is abnormal, when the value of the flag XEMG is "1". It should be noted that the value of the abnormality-occurrence-flag XEMG is set at "0" by the initial routine executed when the ignition key switch (not shown) is turned ON from OFF.

Subsequently, the CPU proceeds to step 995 at which the CPU 81 ends the present routine tentatively. Accordingly, when both the intake air changeover valve 64 and the exhaust gas changeover valve 66 are normal (or when both the value of the exhaust-gas-changeover-valve-abnormality-determination-flag XECV and the value of the intake-air-changeover-valve-abnormality-determination-flag XACV are "0"), a warning is not provided.

Figure 10:
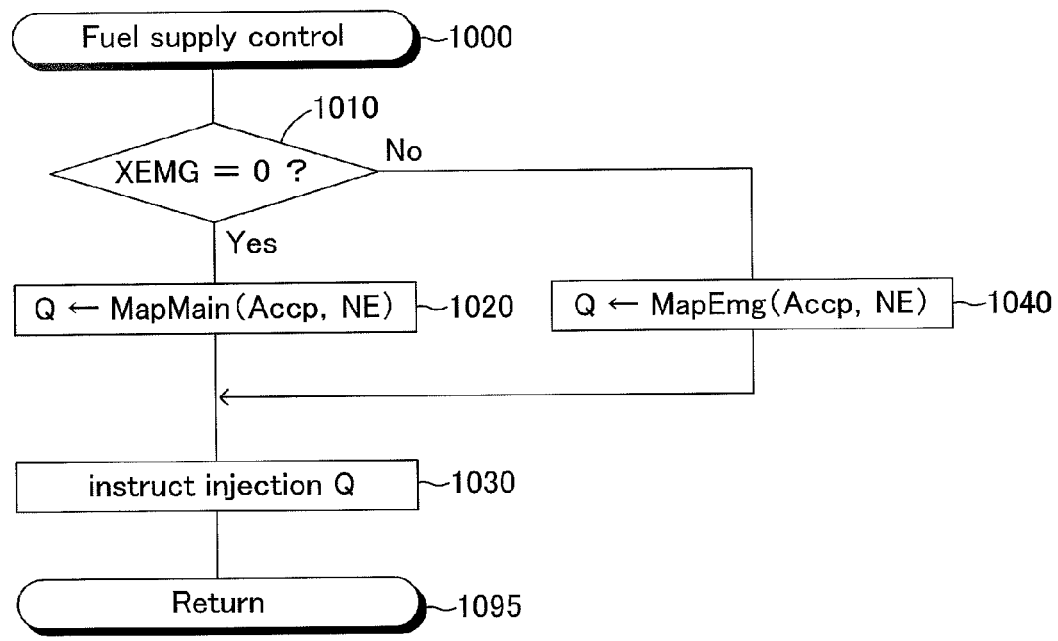
FIG. 10 is a flowchart showing a routine executed by the CPU of the control apparatus according to the embodiment of the present invention.

In addition, the CPU 81 executes "a fuel supply control routine" shown by a flowchart in FIG. 10 every time when a crank angle of any one of the cylinders coincides with a predetermined crank angle $\theta g$ (e.g., 90° crank angle before a compression top dead center). The CPU 81 calculates the fuel injection amount Q and instructs to inject the fuel, by this routine. The cylinder whose crank angle coincides with the predetermined crank angle $\theta g$ before the compression top dead center will be referred to as "a fuel injection cylinder", hereinafter.

More specifically, when any one of the cylinders coincides with the predetermined crank angle $\theta g$, the CPU 81 starts executing the routine from step 1000 in FIG. 10, and proceeds to step 1010 at which the CPU 81 determines whether or not the value of the abnormality-occurrence-flag XEMG is "0". The value of the abnormality-occurrence-flag XEMG is "0" at the present time, the CPU 81 therefore makes a "Yes" determination at step 1010 to proceed to step 1020.

At step 1020, the CPU 81 obtains the opening degree Accp of the accelerator pedal based on the output value of the accelerator opening degree sensor 77, and obtains the engine rotational speed NE based on the output value of the crank position sensor 75. Then, the CPU 81 applies the opening degree Accp of the accelerator pedal at the present time and the engine rotational speed NE at the present time to a normal-operating-state-fuel-injection-amount-table MapMain (Accp, NE) so as to obtain a fuel injection amount Q, the table MapMain (Accp, NE) defining a relation among "the opening degree Accp of the accelerator pedal, the engine rotational speed NE, and the fuel injection amount Q" when all of the control valves are normal, and the table MapMain (Accp, NE) being defined in advance. The fuel injection amount Q when all of the control valves are normal corresponds to a required torque. Hereinafter, an operation in which the fuel injection amount determined by the normal-operating-state-fuel-injection-amount-table MapMain (Accp, NE) is used will be referred to as "a normal operation".

Subsequently, the CPU 81 proceeds to step 1030 at which the CPU 81 provides to the injector 22 disposed for the fuel injection cylinder an instruction to inject the fuel whose amount is the fuel injection amount Q from the injector 22. That is, at this time, the fuel whose amount is the fuel injection amount Q is supplied to the fuel injection cylinder. The CPU 81 thereafter proceeds to step 1095 at which the CPU 81 ends the present routine tentatively.

In this manner, the first apparatus performs "the normal operation" in which the fuel whose amount is equal to the fuel injection amount Q determined based on the normal-operating-state-fuel-injection-amount-table MapMain (Accp, NE) is injected to the fuel injection cylinder, when both the intake air changeover valve 64 and the exhaust gas changeover valve 66 operate normally.

(Assumption B) When the Exhaust Gas Changeover Valve 66 is Abnormal and the Intake Air Changeover Valve 64 is Normal.

Next will be described a case where the exhaust gas changeover valve 66 is abnormal, and therefore the opening degree of the exhaust gas changeover valve 66 remains unchanged even when an instruction to change the opening degree of the exhaust gas changeover valve 66 is provided to the exhaust gas changeover valve 66. In this case, as described above, even when the instruction to change the opening degree of the exhaust gas changeover valve 66 is provided to the exhaust gas changeover valve actuator 66a, the supercharging pressure Pim remains unchanged, and the absolute value of the difference between the supercharging-pressure-for-a-determination Pim1 and the referential supercharging pressure Pim0 is therefore smaller than the threshold supercharging pressure Pimth.

In this case, when the CPU 81 starts executing the routine from step 800 in FIG. 8 at the predetermined timing, the CPU 81 proceeds to step 830 through step 805 to step 825, if the abnormality determining condition is satisfied. According to the assumption B described above, the supercharging-pressure-for-a-determination Pim1 and the referential supercharging pressure Pim0 are equal to each other. The absolute value of the difference between the supercharging-pressure-for-a-determination Pim1 and the referential supercharging pressure Pim0 is therefore smaller than the threshold supercharging pressure Pimth. Accordingly, the CPU 81 makes a "No" determination at step 830 to proceed to step 860. The CPU 81 sets the value of the exhaust-gas-changeover-valve-abnormality-determination-flag XECV at "1" at step 860, and sets the value of the intake-air-changeover-valve-abnormality-determination-flag XACV at "0" at the following step 865. Thereafter, the CPU 81 proceeds to step 895 at which the CPU 81 ends the present routine tentatively.

Further, in this case, the CPU 81 starts executing the routine from step 900 shown in FIG. 9 at the predetermined timing to proceed to step 910. The value of the exhaust-gas-changeover-valve-abnormality-determination-flag XECV is "1" at the present time, and the CPU 81 therefore makes a "No" determination at step 910 to proceed to step 940 at which the CPU 81 notifies the operator of the engine 10 that "the exhaust gas changeover valve 66 is abnormal" by turning on a warning lamp which is not shown, or the like. Thereafter, the CPU 81 sets the value of the abnormality-occurrence-flag XEMG at "1", and proceeds to step 995 at which the CPU 81 ends the present routine tentatively.

As described above, when the exhaust gas changeover valve 66 is abnormal (i.e., the value of the exhaust-gas-changeover-valve-abnormality-determination-flag XECV is "1"), the warning notifying the operator of the engine 10 that "the exhaust gas changeover valve 66 is abnormal" is provided.

Further, when the crank angle of any one of the cylinders coincides with the predetermined crank angle θg, the CPU 81 starts executing the routine from step 1000 in FIG. 10 and proceeds to step 1010. The value of the abnormality-occurrence-flag XEMG is "1" at the present time, and the CPU 81 therefore makes a "No" determination at step 1010 to proceed to step 1040.

At step 1040, the CPU 81 obtains the opening degree Accp of the accelerator pedal based on the output value of the accelerator opening degree sensor 77, and obtains the engine rotational speed NE based on the output value of the crank position sensor 75. Then, the CPU 81 applies the opening degree Accp of the accelerator pedal at the present time and the engine rotational speed NE at the present time to an abnormality-occurring-state-fuel-injection-amount-table MapEmg (Accp, NE) so as to obtain the fuel injection amount Q when the abnormal state is occurring, the table MapEmg (Accp, NE) defining a relation among "the opening degree Accp of the accelerator pedal, the engine rotational speed NE, and the fuel injection amount Q" in advance, and the table MapEmg (Accp, NE) being used when "the intake air changeover valve 64 or the exhaust gas changeover valve 66 is abnormal".

The abnormality-occurring-state-fuel-injection-amount-table MapEmg (Accp, NE) is a table to determine "the fuel injection amount Q which is unlikely to cause other members of the engine 10 or the whole engine 10 to be broken, even if the engine 10 is continued to be operated when the intake air changeover valve 64 or the exhaust gas changeover valve 66 is abnormal". Accordingly, it should be appreciated that the fuel injection amount determined based on the abnormality-occurring-state-fuel-injection-amount-table MapEmg (Accp, NE) with respect to a certain set of "the opening degree Accp of the accelerator pedal and the engine rotational speed NE" is smaller than the fuel injection amount determined based on the normal-operating-state-fuel-injection-amount-table MapMain (Accp, NE) with respect to the certain set of "the opening degree Accp of the accelerator pedal and the engine rotational speed NE". Hereinafter, an operation in which the fuel supply amount determined by the abnormality-occurring-state-fuel-injection-amount-table MapEmg (Accp, NE) is used will be referred to as "an emergency operation".

Subsequently, the CPU 81 proceeds to step 1030 at which the CPU 81 to inject the fuel whose amount is the fuel injection amount Q from the injector 22 disposed for the fuel injection cylinder. Thereafter, the CPU 81 proceeds to step 1095 at which the CPU 81 ends the present routine tentatively.

As described above, when the exhaust gas changeover valve 66 is abnormal, the first apparatus notifies the operator of the engine 10 that "the exhaust gas changeover valve 66 is abnormal" and performs the emergency operation.

(Assumption C) When the Intake Air Changeover Valve 64 is Abnormal, and the Exhaust Gas Changeover Valve 66 is Normal.

Next will be described a case where the intake air changeover valve 64 is abnormal (the valve 64 is in the abnormal open state). In this case, as described above, the supercharging pressure Pim decreases when the opening degree Oecv of the exhaust gas changeover valve 66 is decreased, and the supercharging pressure Pim increases when the opening degree Oecv of the exhaust gas changeover valve 66 is increased. Accordingly, the supercharging-pressure-for-a-determination Pim1 is smaller than the referential supercharging pressure Pim0 when the second opening degree Oecv2 is smaller than the first opening degree Oecv1, the supercharging-pressure-for-a-determination Pim1 is larger than the referential supercharging pressure Pim0 when the second opening degree Oecv2 is larger than the first opening degree Oecv1.

In this sate, the CPU 81 starts executing the routine from step 800 in FIG. 8, and proceeds to step 830 through step 805 to step 825 if the abnormality determining condition is satisfied. According to the assumption C described above, the exhaust gas changeover valve 66 operates normally, the absolute value of the difference between the supercharging-pressure-for-a-determination Pim1 and the referential supercharging pressure Pim0 is therefore larger than or equal to the threshold supercharging pressure Pimth. Accordingly, the CPU 81 makes a "Yes" determination at step 830 to proceed to step 835 at which the CPU 81 sets the value of the exhaust-gas-changeover-valve-abnormality-determination-flag XECV at "0".

Subsequently, if the second opening degree Oecv2 is smaller than the first opening degree Oecv1 when the CPU 81 proceeds to step 840, the CPU 81 proceeds to step 845. In this case (i.e. in the case where the opening degree Oecv of the exhaust gas changeover valve 66 is decreased under the assumption C described above), the supercharging-pressure-for-a-determination Pim1 is smaller than the referential supercharging pressure Pim0, as described above. Accordingly, the CPU 81 makes a "No" determination at step 845 to proceed to step 870 at which the CPU 81 sets the value of the intake-air-changeover-valve-abnormality-determination-flag XACV at "1". Thereafter, the CPU 81 proceeds to step 895 at which the CPU 81 end the present routine tentatively.

On the other hand, if the second opening degree Oecv2 is larger than or equal to the first opening degree Oecv1 (i.e., if the opening degree Oecv of the exhaust gas changeover valve 66 is increased) when the CPU proceeds to step 840, the CPU 81 makes a "No" determination at step 840 to proceed to step 855. In this case (i.e. in the case where the opening degree Oecv of the exhaust gas changeover valve 66 is increased under the assumption C described above), the supercharging-pressure-for-a-determination Pim1 is larger than the referential supercharging pressure Pim0, as described above. Accordingly, the CPU 81 makes a "No" determination at step 855 to proceed to step 870 at which the CPU 81 sets the value of the intake-air-changeover-valve-abnormality-determination-flag XACV at "1". Thereafter, the CPU 81 proceeds to step 895 at which the CPU 81 ends the present routine tentatively.

Further, in this case, the CPU 81 starts executing the routine from step 900 in FIG. 9 at the predetermined timing to proceed to step 910. The value of the exhaust-gas-changeover-valve-abnormality-determination-flag XECV is "0" at the present time, and the CPU 81 therefore makes a "Yes" determination at step 910 to proceed to step 920. The value of the intake-air-changeover-valve-abnormality-determination-flag XACV is "1" at the present time, and the CPU 81 therefore makes a "No" determination at step 920 to proceed to step 960 at which the CPU 81 notifies the operator of the engine 10 that "the intake air changeover valve 64 is abnormal".

Thereafter, the CPU 81 sets the value of the abnormality-occurrence-flag XEMG at "1", and proceeds to step 995 at which the CPU 81 ends the present routine tentatively. Accordingly, when the intake air changeover valve 64 is abnormal (i.e., the value of the intake-air-changeover-valve-abnormality-determination-flag XACV is "1"), the warning notifying the operator of the engine 10 that "the intake air changeover valve 64 is abnormal" is provided.

Further, when the crank angle of any one of the cylinders coincides with the predetermined crank angle θg, the CPU 81 starts executing the routine from step 1000 in FIG. 10, and proceeds to step 1010. The value of the abnormality-occurrence-flag XEMG is "1" at the present time, and the CPU 81 therefore makes a "No" determination at step 1010 to proceed to step 1040.

At step 1040, the CPU 81 obtains the opening degree Accp of the accelerator pedal based on the output value of the accelerator opening degree sensor 77, and obtains the engine rotational speed NE based on the output value of the crank position sensor 75. Then, the CPU 81 applies the opening degree Accp of the accelerator pedal at the present time and the engine rotational speed NE at the present time to the abnormality-occurring-state-fuel-injection-amount-table MapEmg (Accp, NE) described above to obtain the fuel injection amount Q.

Subsequently, the CPU 81 proceeds to step 1030 at which the CPU 81 provides to the injector 22 disposed for the fuel injection cylinder the instruction to inject the fuel whose amount is the fuel injection amount Q from the injector 22. That is, at this time, the fuel whose amount is the fuel injection amount Q is supplied to the fuel injection cylinder. The CPU 81 thereafter proceeds to step 1095 at which the CPU 81 ends the present routine tentatively.

In this manner, when the intake air changeover valve 64 is abnormal, the first apparatus notifies the operator of the engine 10 that "the intake air changeover valve 64 is abnormal" and performs the emergency operation.

As described above, the first apparatus provides the instruction to change the opening degree Oecv of the exhaust gas changeover valve 66 to exhaust gas changeover valve actuator 66a, when the abnormality determining condition is satisfied. The first apparatus obtains the supercharging pressure Pim (the referential supercharging pressure Pim0) at the timing "before" the instruction is provided, and obtains the supercharging pressure Pim (the supercharging-pressure-for-a-determination Pim1) at the timing "after" the instruction is provided. Thereafter, the first apparatus determines that "the exhaust gas changeover valve 66 is abnormal" when the absolute value of the difference between the referential supercharging pressure Pim0 and the supercharging-pressure-for-a-determination Pim1 is smaller than the predetermined value (the threshold supercharging pressure Pimth). On the other hand, in the case where the absolute value of the difference between the referential supercharging pressure Pim0 and the supercharging-pressure-for-a-determination Pim1 is larger than the predetermined value (i.e., the exhaust gas changeover valve 66 operates normally), the first apparatus determines that "the intake air changeover valve 64 is abnormal" if the supercharging-pressure-for-a-determination Pim1 is larger than or equal to the referential supercharging pressure Pim0 when the instruction to increase the opening degree Oecv of the exhaust gas changeover valve 66 is provided to the exhaust gas changeover valve actuator 66a. Further, in the case where the absolute value of the difference between the referential supercharging pressure Pim0 and the supercharging-pressure-for-a-determination Pim1 is larger than the predetermined value, the first apparatus determines that "the intake air changeover valve 64 is abnormal", if the supercharging-pressure-for-a-determination Pim1 is smaller than or equal to the referential supercharging pressure Pim0 when the instruction to decrease the opening degree Oecv of the exhaust gas changeover valve 66 is provided to the exhaust gas changeover valve actuator 66a. Furthermore, when the first apparatus determines that the intake air changeover valve 64 or the exhaust gas changeover valve 66 is abnormal, the first apparatus notifies the operator of the engine accordingly and performs the emergency operation.

That is, the first apparatus is applied to the internal combustion engine 10 which has:

a first supercharger 61 comprising, a first turbine 61b disposed in an exhaust gas passage 42 of the engine 10, and a first compressor 61a disposed in an intake air passage 32 of the engine 10 and driven by the first turbine 61b which is driven by an exhaust gas flowing in the exhaust gas passage 42;

a second supercharger 62 comprising, a second turbine 62b disposed in the exhaust gas passage 42 at a downstream side of the first turbine 61b, and a second compressor 62a disposed in the intake air passage 32 at an upstream side of the first compressor 61a and driven by the second turbine 62b which is driven by the exhaust gas;

a first passage section (the high-pressure-turbine-bypass-passage-section) 65 whose one end is connected to the exhaust gas passage 42 at an upstream side of the first turbine 61b and whose the other end is connected to the exhaust gas passage 42 between the first turbine 61b and the second turbine 62b;

a first control valve (the exhaust gas changeover valve) 66, disposed in the first passage section 65, for varying a flow passage area of the first passage section 65 depending on an opening degree of the first control valve 66;

a second passage section (the high-pressure-compressor-bypass-passage-section) 63 whose one end is connected to the intake air passage 32 between the first compressor 61a and the second compressor 62a and whose the other end is connected to the intake air passage 32 at a downstream side of the first compressor 61a; and a second control valve (the intake air changeover valve) 64, disposed in the second passage section 63, for varying a flow passage area of the second passage section 63 depending on an opening degree of the second control valve 64, and the engine 10 is configured in such a manner that the first control valve 66 and the second control valve 64 are operated in such a manner that at least the first compressor 61a compresses an air introduced into the first compressor 61a and discharge the compressed air, when the engine 10 is operated in a predetermined operating area.

Further, the first apparatus is configured so as to comprise;

supercharging-pressure-corresponding-value-obtaining-means (step 815 and step 825 in FIG. 8) for obtaining a supercharging-pressure-corresponding-value (the supercharging pressure Pim, in the present example) which becomes larger as a pressure of an air in the intake air passage 32 at the downstream side of the first compressor 61a becomes larger; and control valve abnormality determination means (refer to the routine in FIG. 8) for:

obtaining, as a first value, the obtained supercharging-pressure-corresponding-value (supercharging pressure Pim), during a period in which an abnormality determining condition including at least a condition that the engine 10 is operated in the predetermined area is satisfied (the period in which a "Yes" determination is made in step 805 in FIG. 8);

operating the first control valve 66, at a first timing after the timing at which the first value Pim0 is obtained, in such a manner that the opening degree of the first control valve 66 coincides with a second opening degree (the fully-opened-opening-degree, in the present example) different from a first opening degree which is an opening degree of the first control valve 66 at a timing when the first value Pim0 is obtained;

obtaining, as a second value Pim1, the obtained supercharging-pressure-corresponding-value (supercharging pressure Pim) at a second timing at which a predetermined time has elapsed from the first timing;

and determining that the second control valve 64 is abnormal, if the second opening degree (the fully-opened-opening-degree) is larger than the first opening degree and the second value Pim1 is larger than the first value Pim0, or if the second opening degree is smaller than the first opening degree and the second value Pim1 is smaller than the first value Pim0.

As described above, the control apparatus of the present invention can determine whether or not the second control valve (intake air changeover valve) 64 is abnormal, based on the change in the supercharging pressure Pim when (between before and after) the opening degree of the first control valve (exhaust gas changeover valve 66) is changed.

Further, in the first apparatus, the supercharging-pressure-corresponding-value-obtaining-means (step 815 and step 825 in FIG. 8) is configured so as to obtain "a supercharging pressure Pim" which is a pressure of an air in the intake air passage 32 at the downstream side of the first compressor 61a as the supercharging-pressure-corresponding-value (supercharging pressure Pim).

Further, in the first apparatus, the control valve abnormality determination means (refer to the routine in FIG. 8) is configured so as to determine that the first control valve 66 is abnormal, if an absolute value of a difference between the second value Pim1 and the first value Pim0 is smaller than a first control valve-abnormality-determining-threshold-value Pimth (if a "No" determination is made in step 830 in FIG. 8).

Further, in the first apparatus, the control valve abnormality determination means (refer to the routine in FIG. 8) is configured so as to infer that the second control valve 64 is normal, if the control valve abnormality determination means determines that the first control valve 66 is abnormal (i.e., it sets the value of the exhaust-gas-changeover-valve-abnormality-determination-flag XECV at "1" at step 860 in FIG. 8, and simultaneously sets the value of the intake-air-changeover-valve-abnormality-determination-flag XACV at "0" at step 865).

Further, in the first apparatus, the first control valve 66 includes a first control valve driving means (exhaust gas changeover valve actuator 66a) for varying the opening degree of the first control valve 66 to change the flow passage area of the first passage section 65 in response to an instruction signal, and the control valve abnormality determination means (refer to the routine of FIG. 8) is configured so as to change the opening degree of the first control valve 66 by sending the instruction signal to the first control valve driving means (refer to step 820 in FIG. 8).

Further, in the first apparatus, the abnormality determining condition is a condition that is satisfied at least when the engine 10 is operated in a deceleration state in which a torque required for the engine 10 is smaller than or equal to a predetermined torque (refer to the Condition 3 described above).

In the meantime, in the internal combustion engine to which the apparatus for determining an abnormality of a control valve of the present invention is applied, an inner diameter of the low-pressure-turbine-bypass-passage-section (bypass pipe) 67 is "around a diameter which allows only a part of the exhaust gas discharged from the combustion chambers CC to pass through the low-pressure-turbine-bypass-passage-section 67, when the abnormality determining condition is satisfied, and even when the exhaust gas bypass valve 68 is fully opened. In other words, even if the exhaust gas bypass valve 68 is fully opened, a part of the exhaust gas is introduced into the low pressure turbine 62b. Accordingly, the exhaust gas whose amount is larger than zero is flowed into the low pressure turbine 62b regardless of the opening degree of the exhaust gas bypass valve 68. It is therefore possible for the apparatus for determining an abnormality of a control valve of the present invention to determine whether or not the intake air changeover valve 64 and/or the exhaust gas changeover valve 66 is abnormal, regardless of whether the exhaust gas bypass valve 68 is normal or abnormal.

The present invention is not limited to the above embodiment, but may be modified as appropriate without departing from the scope of the invention.

For example, in the embodiment described above, "the supercharging pressure" which is the pressure of the air in the intake air passage at the downstream side of the first compressor is obtained as the supercharging-pressure-corresponding-value. However, the apparatus for determining an abnormality of a control valve of the present invention may be configured so as to obtain, as the supercharging-pressure-corresponding-value (i.e., a value which becomes larger as the supercharging pressure which is the pressure of the air in the intake air passage at the downstream side of the high pressure compressor 61a serving as the first compressor becomes larger), "an amount of a new air (a new air amount)" which is the amount of the air introduced into the engine. In addition, the supercharging pressure obtained as the supercharging-pressure-corresponding-value may be a pressure in the intake air passage between the intercooler 34 and the throttle valve 33.

Further, in the control valve abnormality determination means of the present invention, the second control valve 64 may be configured so as to be operated in such a manner that the second control valve 64 shuts (completely closes) the second passage section 63 when the engine 10 is being operated in the predetermined operating area.

Figure 11:
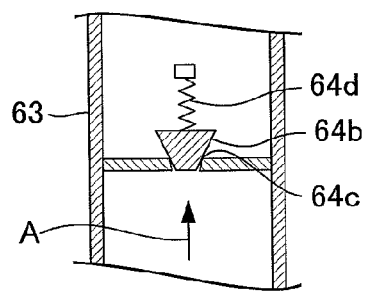
FIG. 11 is a schematic diagram of an example of a structure of the intake air changeover valve which the control apparatus of the present invention can adopt.

In addition, in the control valve abnormality determination means of the present invention, as shown in FIG. 11, the intake air changeover valve 64 serving as the second control vale may be configured in such a manner that the intake air changeover valve 64 comprises a valving element 64b, a valve seat portion 64c against which the valving element 64b rests, and biasing means (spring) 64d for biasing the valving element 64b toward the valve seat portion 64c.

The control valve is configured, in such a manner that the valving element 64b is moved to a first position at which the valving element 64b rests against the valve seat portion 64c by an biasing force generated by the biasing means 64d so as to close the second passage section 63 when a pressure of an air in the second passage section 63 at an upstream side of the second control valve 64 is not larger than a pressure of an air in the second passage section 63 at an downstream side of the second control valve 64 by a predetermined pressure or more, and in such a manner that the valving element 64b is moved to a second position different from the first position against the biasing force generated by the biasing means 64d so as to increase the flow passage area of the second passage section 63 when the pressure of the air in the second passage section 63 at the upstream side of the second control valve 64 is larger than the pressure of the air in the second passage section 63 at the downstream side of the second control valve 64 by the predetermined pressure or more.

That is, this second control valve may be a valve operated independently from an instruction signal generated by the electric control apparatus 80.

Further, in the embodiment described above, the determination as to whether or not the intake air changeover valve 64 is abnormal is made (step 840, step 845, and step 855 in FIG. 8), after the determination as to whether or not the exhaust gas changeover valve 66 is abnormal is made (i.e., after the "Yes" determination is made at step 830 in FIG. 8). However, the apparatus for determining an abnormality of a control valve of the present invention may be configured so as to determine "whether or not the intake air changeover valve 64 is abnormal only". More specifically, the apparatus for determining an abnormality of a control valve of the present invention may be configured so as to repeatedly execute "a routine in which step 830, step 860, and step 865 in the abnormality determination routine shown in FIG. 8 are deleted" every elapse of a predetermined time period.

Furthermore, in step 820 in the embodiment described above, when the first opening degree Oecv1 is always sufficiently small (i.e., the abnormality determining condition in step 805 includes a condition which is satisfied when the engine is being operated in a state where the first opening degree Oecv1 is sufficiently small), the opening degree Oecv of the exhaust gas changeover valve 66 may be changed at step 820 in such a manner that the opening degree Oecv2 is always larger than "the first opening degree Oecv1 which is the present opening degree (e.g., the second opening degree Oecv2 is set at the fully-open-opening-degree)". In this case, step 840 and step 845 may be omitted.

Similarly, in step 820 in the embodiment described above, when the first opening degree Oecv1 is always sufficiently large (i.e., the abnormality determining condition in step 805 includes a condition which is satisfied when the engine is being operated in a state where the first opening degree Oecv1 is sufficiently large), the opening degree Oecv of the exhaust gas changeover valve 66 may be changed at step 820 in such a manner that the opening degree Oecv2 is always smaller than "the first opening degree Oecv1 which is the present opening degree (e.g., the second opening degree Oecv2 is set at the fully-close degree)". In this case, step 840 and step 855 may be omitted.

Further, in the embodiment described above, the opening degree of the throttle valve 33 is set at the fully-open-opening-degree (step 810 in FIG. 8) before the opening degree of the first control valve 66 is set at the fully-open-opening-degree (step 820 in FIG. 8). However, in the apparatus for determining an abnormality of a control valve of the present invention, the opening degree of the throttle valve 33 is not necessarily required to be set at the fully-open-opening-degree, before the opening degree of the first control valve 66 is changed.

Further, in the embodiment described above, the exhaust gas changeover valve opening degree sensor 76 is provided to the engine 10. However, the exhaust gas changeover valve opening degree sensor 76 is just a practical example for obtaining the opening degree Oecv which is shown in the time-line charts of FIG. 4, FIG. 6, and FIG. 7. That is, the internal combustion engine to which the apparatus for determining an abnormality of a control valve of the present invention is applied does not necessarily comprise the exhaust gas changeover valve opening degree sensor 76.

Further, in the embodiment described above, a determination as to whether or not the exhaust gas bypass valve 68 is abnormal is not made. However, the apparatus for determining an abnormality of a control valve of the present invention may be configured so as to determine whether or not the exhaust gas bypass valve 68 is abnormal. More specifically, for example, the apparatus may provide, to the exhaust gas bypass valve actuator 68a, an instruction to change the opening degree of the exhaust gas bypass valve 68 to a certain opening degree different from a current opening degree of the exhaust gas bypass valve 68, when the engine 10 is being operated in a predetermined operating condition. Subsequently, the apparatus may obtain a change in the supercharging pressure Pim when (between before and after) the instruction is provided. Thereafter, the apparatus can determine that the exhaust gas bypass valve 68a is abnormal when the change in the supercharging pressure Pim is smaller than a predetermined value.

The invention claimed is:

1. An apparatus for determining an abnormality of a control valve, the apparatus being applied to an internal combustion engine having:
    a first supercharger comprising a first turbine disposed in an exhaust gas passage of the engine and a first compressor disposed in an intake air passage of the engine and driven by the first turbine which is driven by an exhaust gas flowing in the exhaust gas passage;
    a second supercharger comprising a second turbine disposed in the exhaust gas passage at a downstream side of the first turbine and a second compressor disposed in the intake air passage at an upstream side of the first compressor and driven by the second turbine which is driven by the exhaust gas;
    a first passage section whose one end is connected to the exhaust gas passage at an upstream side of the first turbine and whose the other end is connected to the exhaust gas passage between the first turbine and the second turbine;
    a first control valve, disposed in the first passage section, for varying a flow passage area of the first passage section depending on an opening degree of the first control valve;
    a second passage section whose one end is connected to the intake air passage between the first compressor and the second compressor and whose the other end is connected to the intake air passage at a downstream side of the first compressor, and
    a second control valve, disposed in the second passage section, for varying a flow passage area of the second passage section depending on an opening degree of the second control valve,
    the engine is configured in such a manner that the first control valve and the second control valve are operated in such a manner that the first supercharger superchargers the engine more efficiently than the second supercharger when the engine is operated in a predetermined operating area,
    the apparatus for determining an abnormality of a control valve comprising an electronic control unit having control logic configured to cause the electronic control unit to perform the following:
    first operation to obtain a supercharging-pressure-corresponding-value which becomes larger as a pressure of air in the intake air passage at the downstream side of the first compressor becomes larger;
    second operation to obtain, as a first value, the obtained supercharging-pressure-corresponding-value;
    operate the first control valve, at a first timing after the timing at which the first value is obtained, in such a manner that the opening degree of the first control valve coincides with a second opening degree different from a first opening degree which is an opening degree of the first control valve at a timing when the first value is obtained; and
    obtain, as a second value, the obtained supercharging-pressure-corresponding-value at a second timing at which a predetermined time has elapsed from the first timing,
    during a period in which an abnormality determining condition including at least a condition that the engine is operated in the predetermined area is satisfied,
    and
    third operation to determine that the second control valve is abnormal, if the second opening degree is larger than the first opening degree and the second value is larger than the first value, or if the second opening degree is smaller than the first opening degree and the second value is smaller than the first value.

2. The apparatus for determining an abnormality of a control valve according to claim 1, wherein
    the electronic control unit is configured to obtain a supercharging pressure which is a pressure of air in the intake air passage at the downstream side of the first compressor as the supercharging-pressure corresponding-value.

3. The apparatus for determining an abnormality of a control valve according to claim 1, wherein
    the electronic control is configured to obtain an amount of new air introduced into the engine as the supercharging-pressure-corresponding-value.

4. The apparatus for determining an abnormality of a control valve according to claim 1, wherein
    the electronic control is configured to determine that the first control valve is abnormal if an absolute value of a difference between the second value and the first value is smaller than a first control valve abnormality determination threshold value.

5. The apparatus for determining an abnormality of a control valve according to claim 4, wherein
    the electronic control is configured to infer that the second control valve is normal if the electronic control unit determines that the first control valve is abnormal.

6. The apparatus for determining an abnormality of a control valve according to claim 1, wherein
    the second control valve is operated to close the second passage section when the engine is operated in the predetermined operating area.

7. The apparatus for determining an abnormality of a control valve according to claim 1, wherein
    the second control valve comprises a valve, a valve seat portion against which the valve rests, and a spring for biasing the valve toward the valve seat portion, and the second control valve is configured in such a manner that the valve is moved to a first position at which the valve rests against the valve seat portion by an biasing force generated by the spring so as to close the second passage section when a pressure of air in the second passage section at an upstream side of the second control valve is not larger than a pressure of air in the second passage section at an downstream side of the second control valve by a predetermined pressure or more, and in such a manner that the valve is moved to a second position different from the first position against the biasing force generated by the spring so as to increase the flow passage area of the second passage section when the pressure of air in the second passage section at the upstream side of the second control valve is larger than the pressure of air in the second passage section at the downstream side of the second control valve by the predetermined pressure or more.

8. The apparatus for determining an abnormality of a control valve according to claim 1, wherein
the first control valve includes a valve actuator varying the opening degree of the first control valve to change the flow passage area of the first passage section in response to an instruction signal, and
the electronic control unit is configured to change the opening degree of the first control valve by sending the instruction signal to the valve actuator.

9. The apparatus for determining an abnormality of a control valve according to claim 1, wherein
the abnormality determining condition is a condition that is satisfied when at least a requirement that the engine is operated in a deceleration state in which a torque required for the engine is smaller than or equal to a predetermined torque is met.

* * * * *